United States Patent
Lunde et al.

(10) Patent No.: US 11,378,706 B2
(45) Date of Patent: Jul. 5, 2022

(54) METHODS AND SYSTEMS TO SEPARATE SEISMIC DATA ASSOCIATED WITH IMPULSIVE AND NON-IMPULSIVE SOURCES

(71) Applicant: PGS Geophysical AS, Oslo (NO)

(72) Inventors: Nils Lunde, Oslo (NO); Okwudili Chuks Orji, Oslo (NO); Mattias Dan Christian Oscarsson, Oslo (NO)

(73) Assignee: PGS Geophysical AS, Oslo (NO)

( * ) Notice: Subject to any disclaimer, the term of this patent is extended or adjusted under 35 U.S.C. 154(b) by 961 days.

(21) Appl. No.: 16/134,235

(22) Filed: Sep. 18, 2018

(65) Prior Publication Data
US 2019/0018158 A1    Jan. 17, 2019

Related U.S. Application Data

(62) Division of application No. 14/816,561, filed on Aug. 3, 2015, now Pat. No. 10,101,480.
(Continued)

(51) Int. Cl.
*G01V 1/36* (2006.01)
*G01V 1/38* (2006.01)

(52) U.S. Cl.
CPC .......... *G01V 1/366* (2013.01); *G01V 1/36* (2013.01); *G01V 1/3808* (2013.01);
(Continued)

(58) Field of Classification Search
CPC ........ G01V 1/366; G01V 1/36; G01V 1/3808; G01V 2210/1212; G01V 2210/1214; G01V 2210/127; G01V 2210/20
See application file for complete search history.

(56) References Cited

U.S. PATENT DOCUMENTS 3,351,899 A    11/1967  Luehrmann et al.
3,744,021 A    7/1973   Todd
(Continued)

FOREIGN PATENT DOCUMENTS

DE    27 31 044 A1    1/1979
EP    0 047 100 A2    3/1982
(Continued)

OTHER PUBLICATIONS

Parkes, G.E., et al., "The signature of air gun array: Computation from near-field measurements including interactions-Practical considerations," Geophysics, vol. 48, No. 2, pp. 105-111, Feb. 1984.
(Continued)

*Primary Examiner* — Krystine E Breier

(57) ABSTRACT

Methods and systems to separate seismic data associated with impulsive and non-impulsive sources are described. The impulsive and non-impulsive sources may be towed through a body of water by separate survey vessels. Receivers of one or more streamers towed through the body of water above a subterranean formation generate seismic data that represents a reflected wavefield produced by the subterranean formation in response to separate source wavefields generated by simultaneous activation of the impulsive source and the non-impulsive source. Methods and systems include separating the seismic data into impulsive source seismic data associated with the impulsive source and non-impulsive source seismic data associated with the non-impulsive.

15 Claims, 20 Drawing Sheets

Related U.S. Application Data

(60) Provisional application No. 62/065,882, filed on Oct. 20, 2014.

(52) U.S. Cl.
CPC ............... *G01V 2210/127* (2013.01); *G01V 2210/1212* (2013.01); *G01V 2210/1214* (2013.01); *G01V 2210/20* (2013.01)

(56) References Cited

U.S. PATENT DOCUMENTS

| | | |
|---|---|---|
| 4,170,002 A | 10/1979 | Strange |
| 4,472,794 A | 9/1984 | Chelminski |
| 4,476,550 A | 10/1984 | Ziolkowski ............ G01H 3/005 367/21 |
| 4,476,553 A | 10/1984 | Ziolkowski ............ G01V 13/00 181/110 |
| 4,486,866 A | 12/1984 | Muir |
| 4,658,384 A | 4/1987 | Dragoset, Jr. et al. |
| 4,709,361 A | 11/1987 | Dahlstrom et al. |
| 4,908,801 A | 3/1990 | Bell et al. |
| 4,914,636 A | 8/1990 | Garrotta |
| 5,652,735 A | 7/1997 | Johansen et al. |
| 6,885,918 B2 | 4/2005 | Harmon et al. |
| 6,906,981 B2 | 6/2005 | Vaage |
| 7,239,577 B2 | 7/2007 | Tenghamn et al. |
| 7,376,045 B2 | 5/2008 | Falkenberg et al. |
| 7,457,193 B2 | 11/2008 | Pramik |
| 7,616,523 B1 | 11/2009 | Tabti et al. |
| 8,274,290 B2 | 9/2012 | Summerfield et al. |
| 8,427,901 B2* | 4/2013 | Lunde .................. G01V 1/366 367/23 |
| 8,811,113 B2 | 8/2014 | Barr, Jr. |
| 8,902,698 B2 | 12/2014 | Hegna et al. |
| 8,958,267 B2 | 2/2015 | Eick ........................ G01V 1/37 367/41 |
| 9,075,162 B2 | 7/2015 | Baardman et al. |
| 10,101,480 B2* | 10/2018 | Lunde .................. G01V 1/366 |
| 2009/0086574 A1 | 4/2009 | Scott et al. |
| 2011/0128818 A1 | 6/2011 | Eick ........................ G01V 1/37 367/38 |
| 2011/0139537 A1 | 6/2011 | Greig |
| 2011/0149683 A1* | 6/2011 | Lunde .................... G01H 3/00 367/21 |
| 2012/0294649 A1 | 11/2012 | Kikuchi |
| 2014/0241117 A1 | 8/2014 | Dellinger .............. G01V 1/3808 367/15 |
| 2014/0249757 A1 | 9/2014 | Gratacos |
| 2017/0184746 A1 | 6/2017 | Halliday ................ G01V 1/306 |
| 2019/0187314 A1* | 6/2019 | Hodges ................ G01V 1/3808 |

FOREIGN PATENT DOCUMENTS

| | | |
|---|---|---|
| EP | 6 047 100 A3 | 3/1982 |
| EP | 1 464 991 A1 | 10/2004 |
| GB | 2334103 A | 8/1999 |
| RU | 1805414 A1 | 3/1993 |
| WO | 01/16621 A1 | 3/2001 |
| WO | 2015011160 | 1/2015 |

OTHER PUBLICATIONS

Ziolkowski, A., et al., "The signature of an air gun array: Computation from near-field measurements including interactions," Geophysics, pp. 1413-1421, vol. 47, No. 10, Oct. 1982.

Ziolkowski, Anton, "The determination of the far-field signature of an interacting array of marine seismic sources from near-field measurement—results from the Delft Air Gun Experiment," First Break, vol. 5, No., Jan. 1987.

Ziolkowski, A.M. and Johnston, R.G.K., "Marine seismic sources: QC of wavefield computation from near-fied pressure measurements," Geophysical Prospecting, pp. 611-639, vol. 45, 1997.

Ziolkowski, Anton, "Simplified wavelet estimation using source-signature measurements," pp. 61-67, The Leading Edge, Jan. 2000.

Berdhout, A.J., et al., "From simultaneous shooting to blended acquisition," 78th Society of Exploration Geophysicists International Exposition and Annual Meeting: SEG Las Vegas 2008, Nov. 9, 2008, pp. 2831-2837.

PCT Search Report, PCT/EP2015/074248, dated Jan. 26, 2016.

* cited by examiner

METHODS AND SYSTEMS TO SEPARATE SEISMIC DATA ASSOCIATED WITH IMPULSIVE AND NON-IMPULSIVE SOURCES

CROSS-REFERENCE TO RELATED APPLICATIONS

This application is a divisional of application Ser. No. 14/816,561, filed Aug. 3, 2015, which claims the benefit of Provisional Application 62/065,882, filed Oct. 20, 2014.

BACKGROUND

Marine surveys typically illuminate a subterranean formation located beneath a body of water with acoustic signals produced by one or more submerged impulsive sources. A typical impulsive source includes an array of air guns, each of which is connected by a hose to a compressor located onboard a survey vessel that tows the impulsive source through the body of water. Each air gun has a chamber that stores compressed air or gas at a selected charge pressure. An impulsive source may be activated by electronically triggering the air guns. When an air gun is triggered, air or gas is forced through vents into the water, creating a high-pressure, oscillating primary bubble followed by a foam of smaller oscillating secondary bubbles. The bubble oscillation period of a primary bubble produced by a single air gun may be related to the volume of the air gun chamber and charge pressure of the air or gas stored in the chamber as follows:

$$T = K \frac{P^{1/3} V^{1/3}}{(P_0 + \rho g D)^{5/6}} \quad (1)$$

where
T is a bubble oscillation period;
P is the air or gas charge pressure of the air gun;
V is the air gun chamber volume;
$P_0$ is atmospheric pressure;
$\rho$ is density of water;
g is Earth's gravitational acceleration;
D is depth of the air gun in the water; and
K is a constant that depends on the units of measure of the forgoing parameters.

The vibrational frequency of the primary bubble oscillation is $f=1/T$. An oscillating primary bubble creates acoustic energy at vibrational frequencies that allow the acoustic energy to propagate into the subterranean formation.

The air guns of an array may be selected with particular chamber volumes and operated at selected charge pressures so that when the air guns are activated nearly simultaneously a desired acoustic signal is produced. The acoustic signal vibrates at frequencies that allow the acoustic energy to propagate into the subterranean formation. According to Equation (1), the lowest frequency bubble oscillation of an air gun array, $f_{low}$, is the reciprocal of the longest bubble oscillation period, $T_{longest}$, which is produced by the air gun with the largest chamber volume and/or highest charge pressure.

Although air gun arrays are widely used in marine surveys, air gun arrays are typically not configured with air guns that generate acoustic energy at frequencies below about 8 Hz. Equation (1) indicates that it should be theoretically possible to increase the bubble period T (i.e., expand the low-frequency end of an air gun array frequency spectrum) by simply increasing the chamber volume of the largest air guns and/or operating certain air guns at higher charge pressures. While it may be theoretically possible to build such air guns, the size of the air guns needed to support larger chamber volumes may be impractical and would require a substantial increase in the capacity of a shipboard compressor used to fill the chamber. Air guns also become increasingly less reliable when operated at higher charge pressures. Those working in marine seismology continue to seek methods and systems to expand the low-frequency range of acoustic signals used to illuminate a subterranean formation.

DETAILED DESCRIPTION

Methods and systems to determine a subterranean response to source wavefields generated by an impulsive source and a non-impulsive source of a marine survey are described. The impulsive and non-impulsive source may be towed by separate survey vessels through a body of water above a subterranean formation. Receivers of one or more streamers may be towed through a body of water above the subterranean formation while the non-impulsive source may be continuously activated, and the impulsive source may be activated with time delays (e.g., periodic, pseudo-random, or random). The receivers generate seismic data that represents a reflected wavefield produced by the subterranean formation in response to the separate source wavefields generated by the impulsive source and the non-impulsive source. Methods and systems include separating the seismic data into impulsive source seismic data associated with the impulsive source and non-impulsive source seismic data associated with the non-impulsive source.

Figure 1A:
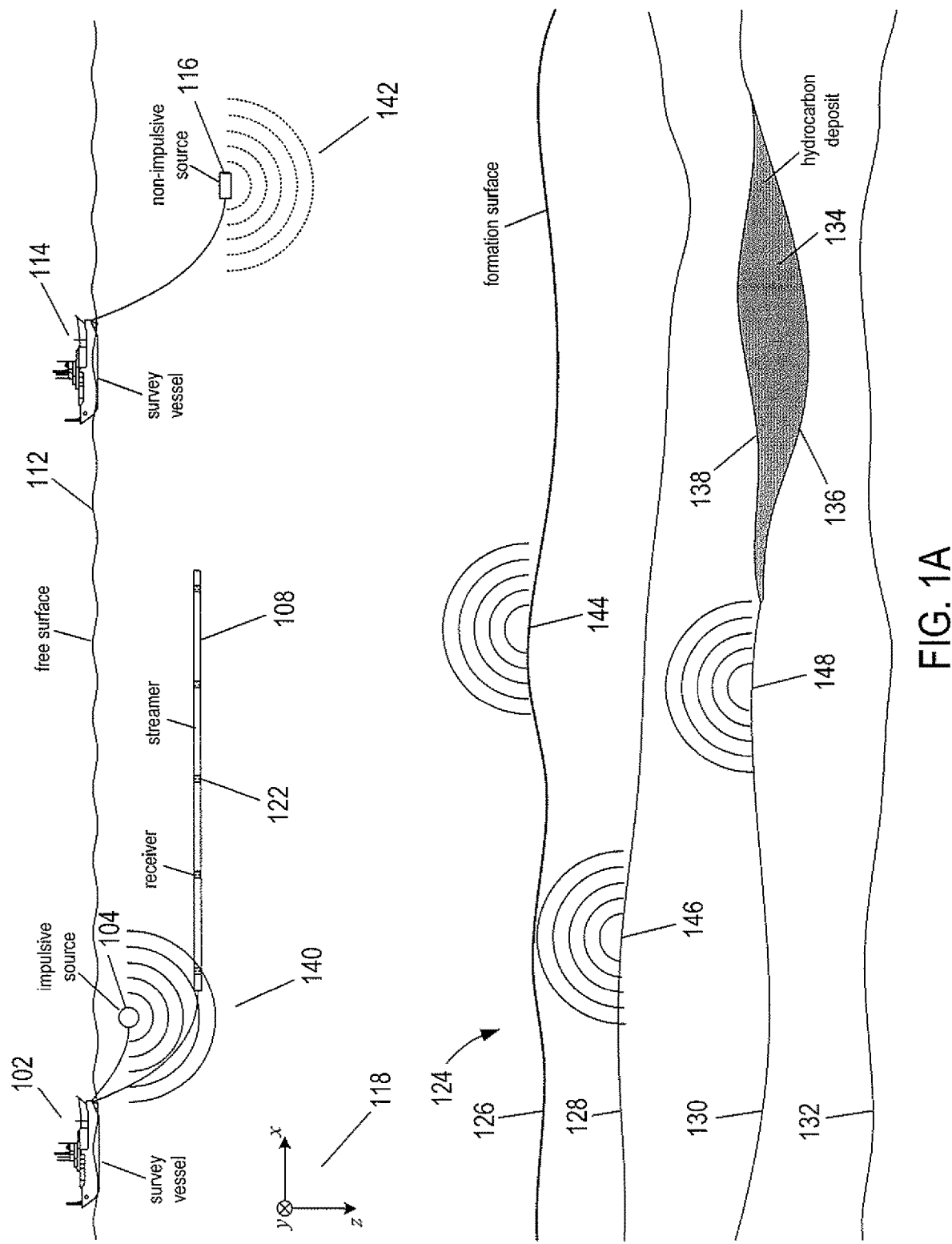
FIGS. 1A-1B show side-elevation and top views of an example seismic data acquisition system.
Figure 1B:
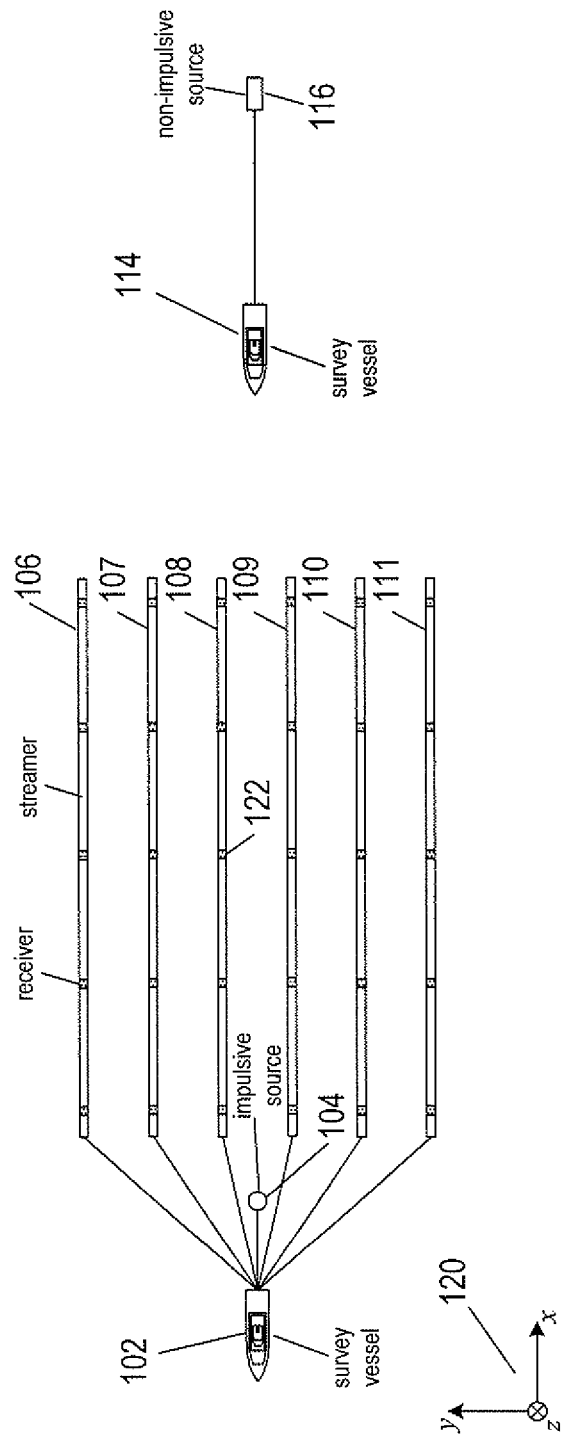

FIGS. 1A-1B show side-elevation and top views, respectively, of an example seismic data acquisition system composed of a first survey vessel 102 towing an impulsive source 104 and six separate streamers 106-111 beneath a free surface 112 of a body of water and a second survey vessel 114 towing a non-impulsive source 116 beneath the free surface 112. The body of water can be, for example, an ocean, a sea, a lake, or a river, or any portion thereof. In this example, each streamer is attached at one end to the survey vessel 102 via a streamer-data-transmission cable. The illustrated streamers 106411 form a planar horizontal data acquisition surface with respect to the free surface 112. However, in practice, the data acquisition surface may be smoothly varying due to active sea currents and weather conditions. In other words, although the streamers 106-111 are illustrated in FIGS. 1A and 1B and subsequent figures as straight and substantially parallel to the free surface 112, in practice, the towed streamers may undulate as a result of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. It should also be noted that the number of impulsive sources is not limited to a single impulsive source. In practice, the number of impulsive sources selected to generate acoustic energy may range from as few as one impulsive source to three or more sources and the sources may be towed in groups by one or more vessels. In other implementations, the impulsive source 104 may be towed by one survey vessel and the streamers may be towed by a different survey vessel.

FIG. 1A includes an xz-plane 118 and FIG. 1B includes an xy-plane 120 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers (or a specified portion thereof when the length of the streamers are curved) and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles, such as receiver 122, spaced-apart along the length of each streamer to recording and data processing equipment and data-storage devices located on board the survey vessel 102.

Streamer depth below the free surface 112 can be estimated at various locations along the streamers (e.g., using depth-measuring devices attached to the streamers). For example, depth-measuring devices can measure hydrostatic pressure or utilize acoustic distance measurements. The depth-measuring devices can be integrated with depth controllers and lateral position controllers that control and maintain the depth and position of the streamers as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free surface 112.

FIG. 1A shows a cross-sectional view of the survey vessel 102 towing the impulsive source 104 and the survey vessel 114 towing the non-impulsive source 116 above a subterranean formation 124. Curve 126, the formation surface, represents a top surface of the subterranean formation 124 located at the bottom of the body of water. The subterranean formation 124 may be composed of a number of subterranean layers of sediment and rock. Curves 128, 130, and 132 represent interfaces between subterranean layers of different compositions. A shaded region 134, bounded at the top by a curve 138 and at the bottom by a curve 136, represents a subterranean hydrocarbon deposit, the depth and positional coordinates of which may be estimated, at least in part, by analysis of seismic data collected during a marine survey. As the survey vessels 102 and 114 move over the subterranean formation 124, the impulsive source 104 may be activated to produce an impulsive source wavefield at spatial and/or temporal intervals, and the non-impulsive source 116 may be activated to produce an acoustic non-impulsive source wavefield. Activation of the impulsive source 104 is often called a "shot." The nature and location of subterranean hydrocarbon deposit 134 can be better understood by determining the response of subterranean formation 124 to the impulsive source 104 and the non-impulsive source 116.

Semicircles 140 of increasing radius represent an impulsive source wavefield expanding outward from the impulsive source 104, and semicircles 142 of increasing radius represent a non-impulsive source wavefield. The outwardly expanding source wavefields 140 and 142 from the sources 104 and 116 may be three-dimensional (e.g., spherical) but are shown in vertical plane cross section in FIG. 1A. The outward and downward expanding portion of the impulsive and non-impulsive source wavefields 140 and 142 and portions of the source wavefields 140 and 142 reflected from the free surface 112 eventually reach the formation surface 126, at which point the wavefields may be partially reflected from the formation surface 126 and partially refracted downward into the subterranean formation 124, becoming elastic waves within the subterranean formation 124. In other words, in the body of water, the impulsive source wavefield 140 and non-impulsive source wavefield 142 are composed primarily of compressional pressure waves, or P-waves, while in the subterranean formation 124, the waves include both P-waves and transverse waves, or S-waves. Within the subterranean formation 124, at each interface between different types of materials or at discontinuities in density or in one or more of various other physical characteristics or parameters, downward propagating waves may be partially reflected and partially refracted. As a result, each point of the formation surface 126 and each point of the interfaces 128, 130, and 132 may be a reflector that becomes a potential secondary point source from which acoustic and elastic wave energy, respectively, may emanate upward toward the receivers 122 in response to the source wavefields 140 and 142 generated by the sources 104 and 116. As shown in FIG. 1A, wavefields of significant amplitude may be generally reflected from points on or close to the formation surface 126, such as point 144, and from points on or very close to interfaces in the subterranean formation 124, such as points 146 and 148. The upward expanding waves reflected from the subterranean formation 124 are collectively called the "reflected wavefield."

The waves that compose the reflected wavefield may be generally reflected at different times within a range of times following activation of the impulsive source 104 and non-impulsive source 116. A pressure disturbance from the impulsive source wavefield 140 reaches a point on the formation surface 126, such as the point 144, more quickly than a point within the subterranean formation 124, such as point 148. Similarly, a pressure disturbance from the impulsive source wavefield 140 reaches a point on the formation surface 126 located directly beneath the impulsive source 104 sooner than a more distant-lying point on the formation surface 126. Thus, the times at which secondary and higher-order waves are reflected from various points within the subterranean formation 124 may be related to the distance, in three-dimensional space, of the points from the activated source.

Each receiver 122 may be a pressure sensor that detects variations in water pressure over time, or a particle motion sensor that detects particle displacement, velocities, or accelerations over time. Each receiver 122 may also be a multi-component sensor composed of one or more particle motion sensors collocated with a pressure sensor. The streamers 106-111 and the survey vessels 102 and 114 may include sensing electronics and the survey vessel 102 may include data-processing facilities that allow seismic data generated by each receiver to be correlated with the time the impulsive source 104 and non-impulsive source 116 are activated, absolute positions on the free surface 112, and/or absolute three-dimensional positions with respect to an arbitrary three-dimensional coordinate system. The pressure data and particle motion data may be stored at the receiver, and/or may be sent along the streamers and data transmission cables to the survey vessel 102, where the data may be stored electronically or magnetically on data-storage devices located onboard the survey vessel 102.

Figure 2:
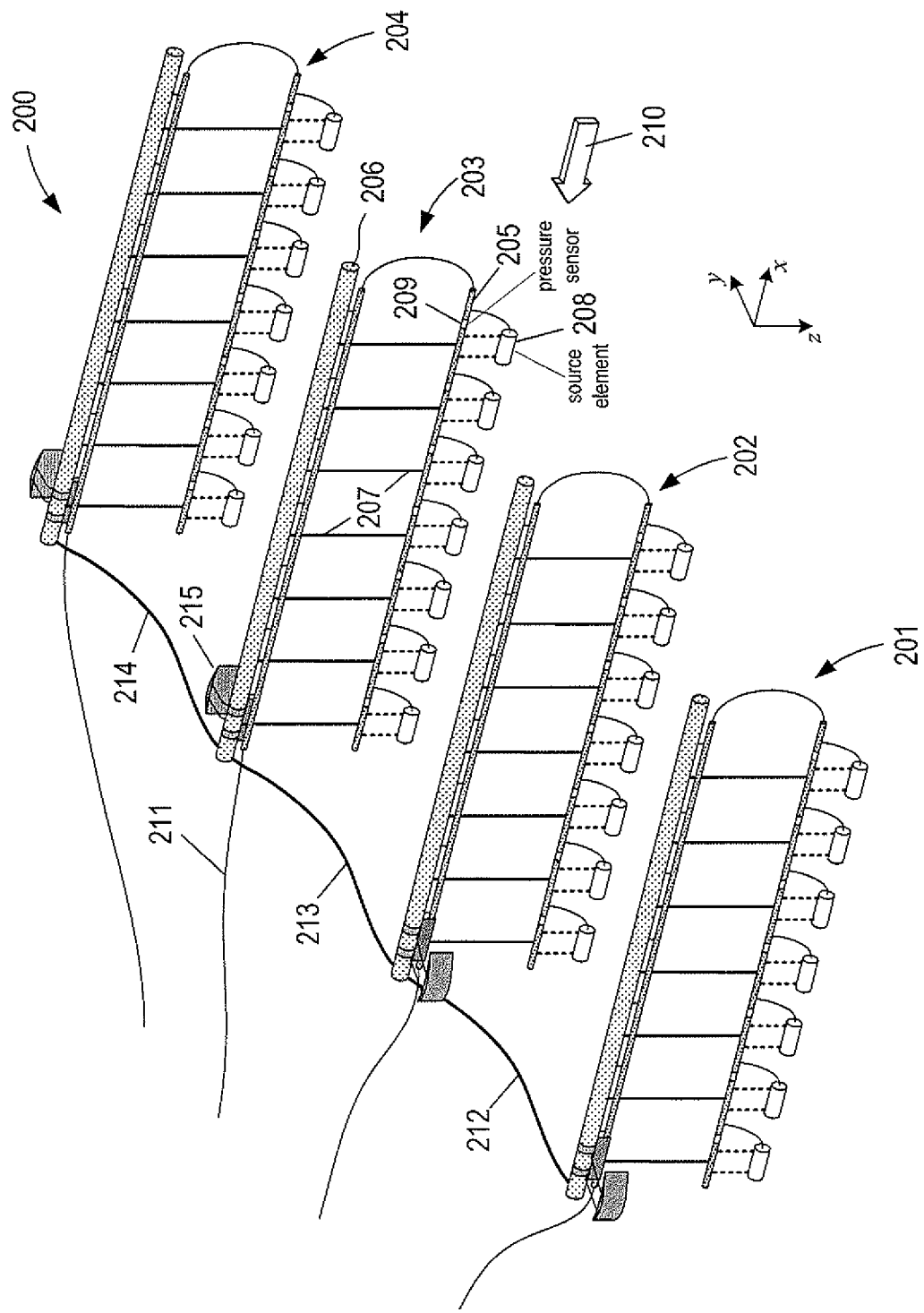
FIG. 2 shows an isometric view of an example impulsive source.

The impulsive source 104 towed behind the survey vessel 102 may consist of a number of impulsive source elements. FIG. 2 shows an isometric view of an example impulsive source 200 composed of four sub-arrays 201-204, each having a plurality of impulsive source elements 208. In this example, the sub-arrays 201-204 have the same components. For example, sub-array 203 includes a semi-rigid rod 205 suspended from a float 206 by depth ropes 207. Seven impulsive source elements, such as impulsive source element 208, are suspended from the semi-rigid rod 205. Examples of impulsive source elements include air guns or water guns. The sub-array 203 also includes seven pressure sensors, such as pressure sensor 209, spaced apart along the semi-rigid rod 205. Each pressure sensor is located along the semi-rigid rod 205 in close proximity to one impulsive source element in order to measure a pressure disturbance created by the impulsive source element as the impulsive source 200 moves in the direction represented by directional arrow 210. For example, the pressure sensor 209 is located in close proximity (e.g., approximately 1 m, less than 10 m, etc.) to the impulsive source element 208 in order to measure a pressure disturbance created by the impulsive source element 208 when activated. For example, the pressure sensors may be hydrophones. Each sub-array is connected to a cable, such as cable 211, that in turn is connected to the survey vessel. The cable may include electrical wires that transmit electrical activation signals to each impulsive source element and transmit electrical signals generated by each pressure sensor back to the survey vessel and may include an air hose that carries compressed air from the survey vessel to each impulsive source element. The sub-arrays 201-204 are connected by cables 212-214, and each sub-array includes a steering device, such as a wing that may be used to separately steer and control the direction the sub-array travels while being towed through the body of water. For example, the sub-array 203 includes a wing 215 that may be used to control the lateral direction of the sub-array 203.

Note that impulsive sources are not intended to be limited to the example twenty-eight impulsive source elements shown in FIG. 2. For example, an impulsive source may have up to 80 or more impulsive source elements. A typical impulsive source may include one or more floats, and each float may have any number of source elements suspended from the float. An impulsive source may include a global positioning system ("GPS") satellite receiver attached to on one or more of the floats. The GPS enables determination of the impulsive source geodetic position, and, therefore, the geodetic position of each pressure sensor and each source element may be determined at any moment in time because their relative coordinate locations with respect to the location of the GPS is known. Signals from the GPS may be communicated to the recording system located on board a survey vessel. The impulsive source 200 may also include an acoustic positioning system (not shown), for example attached to one or more of the semi-rigid rods 205. The acoustic position system may generate acoustic signal that may be used to determine the position of the impulsive source.

An impulsive source may have a directional effect on transmission of the acoustic signal. In other words, the amplitude over time of an impulsive source wavefield may vary with direction. This is a result of the impulsive source having dimensions that are not small with respect to the wavelengths of the impulsive source wavefield. By contrast, the individual impulsive source elements are normally very small by comparison with respect to the wavelengths of the impulsive source wavefield, and therefore, behave individually like pressure wave point sources. In other words, a single pressure wave created by an impulsive source element may have spherical symmetry, and may be essentially the same shape in all directions.

Figure 3A:
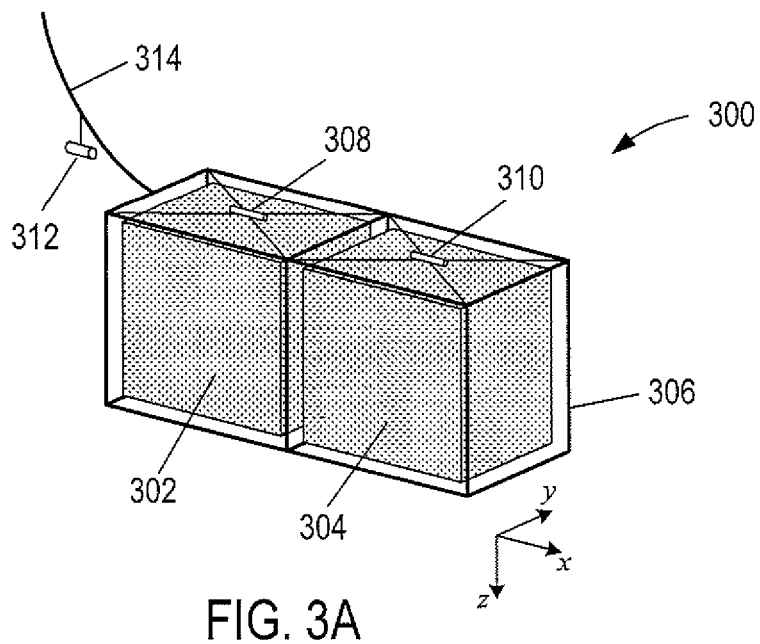
FIG. 3A shows an isometric view of an example non-impulsive source composed of two collocated non-impulsive source elements.

On the other hand, the non-impulsive source 116 towed by the survey vessel 114 may consist of one or more non-impulsive source elements. FIG. 3A shows an isometric view of an example non-impulsive source 300 composed a two electronically operated non-impulsive source elements 302 and 304 supported by a chassis 306. The non-impulsive source 300 includes two pressure sensors 308 and 310 located in close proximity (e.g., approximately 1 m, less than about 2 m) to corresponding non-impulsive source elements 302 and 304, and includes a position determination device 312. For example, the position determination device 312 may be an acoustic range detector that detects acoustic signals transmitted from several different locations (e.g., from the survey vessel 114) so that the geodetic location of the non-impulse source 300 and relative locations of the non-impulsive source elements 302 and 304 may be determined at any moment in time. A cable 314 that connects the non-impulsive source 300 to a survey vessel enables transmission of electrical signals to separately operate the non-impulsive source elements 302 and 304 and transmit data generated by the pressure sensors 308 and 310 and position determination device 312 to the survey vessel.

Figure 3B:
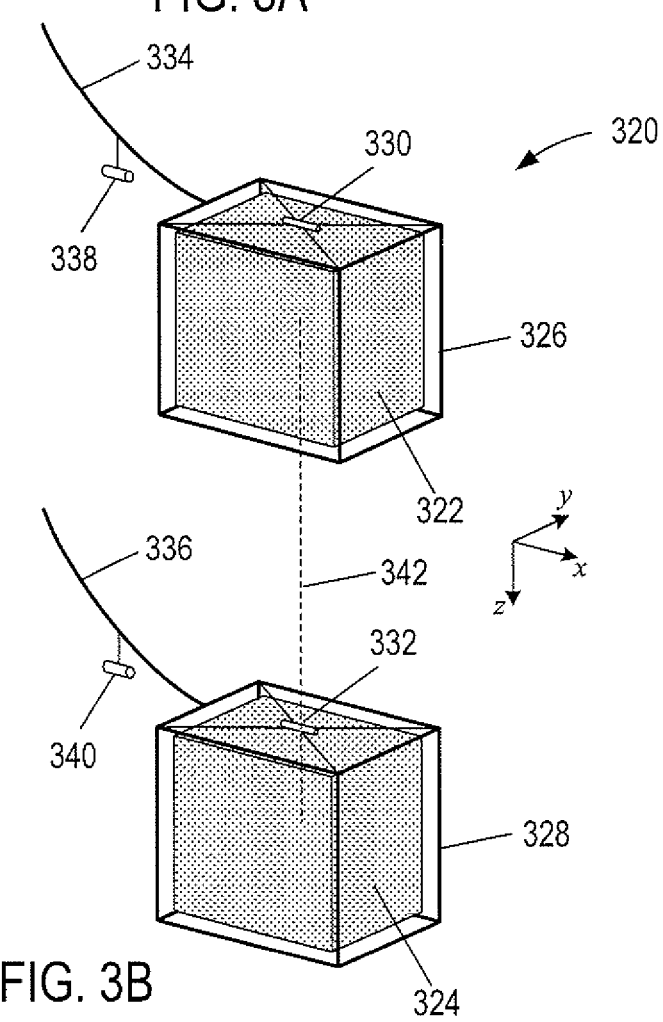
FIG. 3B shows an isometric view of an example non-impulsive source composed of two non-impulsive source elements located at different depths.

In an alternative implementation, a non-impulsive source may be composed of non-impulsive source elements towed at different depths below the free surface. FIG. 3B shows an isometric view of an example non-impulsive source 320 composed two separate electronically operated non-impulsive source elements 322 and 324, each supported by a different chassis 326 and 328, respectively. The non-impulsive source 320 includes a pressure sensor 330 located in close proximity (e.g., approximately 1 m, less than about 2 m) to corresponding non-impulsive source element 322, and a pressure sensors 332 located in close proximity (e.g., approximately 1 m, less than about 2 m) to corresponding non-impulsive source element 324. Separate cables 334 and 336 connect corresponding non-impulsive source elements 322 and 324 to a survey vessel. The non-impulsive source elements 322 and 324 have associated position determination device 338 and 340. In this example, the non-impulsive source elements 322 and 324 are towed at different depths, as indicated by a dashed line 342 that represents the vertical distance between centers of the non-impulsive source elements 322 and 324.

Note that non-impulsive sources are not intended to be limited to two non-impulsive source elements. In practice, a non-impulsive source may be composed of as few as one non-impulsive source element or more than two non-impulsive source elements. Examples of non-impulsive source elements include a marine vibrator and a superheterodyne transducer. A non-impulsive source may be configured with floats and/or paravanes to control the depth and position of the non-impulsive source while it is towed through a body of water, as shown in the example of FIG. 1A.

Each impulsive source element of an impulsive source generates acoustic energy over a narrow band of frequencies based on the chamber volume and charge pressure at which the source element is operated. As a result, an impulsive source may have various impulsive source elements selected with different chamber volumes and operated with different charge pressures in order to generate a broadband impulsive source wavefield. However, the typical broadband acoustic energy generated by an impulsive source has a low-frequency limit, $f_{low}$. For example, the lowest frequency a typical air gun array is capable of producing is about 8 Hz. On the other hand, a non-impulsive source may generate acoustic energy over a band of frequencies that extends below this low-frequency limit. For example, marine vibrators may generate acoustic energy within a band of frequencies less than about 8 Hz. A non-impulsive source may be used in combination with an impulsive source to illuminate a subterranean formation with acoustic energy over a broader range of frequencies than can be achieved by either an impulsive source or non-impulsive source alone.

Figure 4:
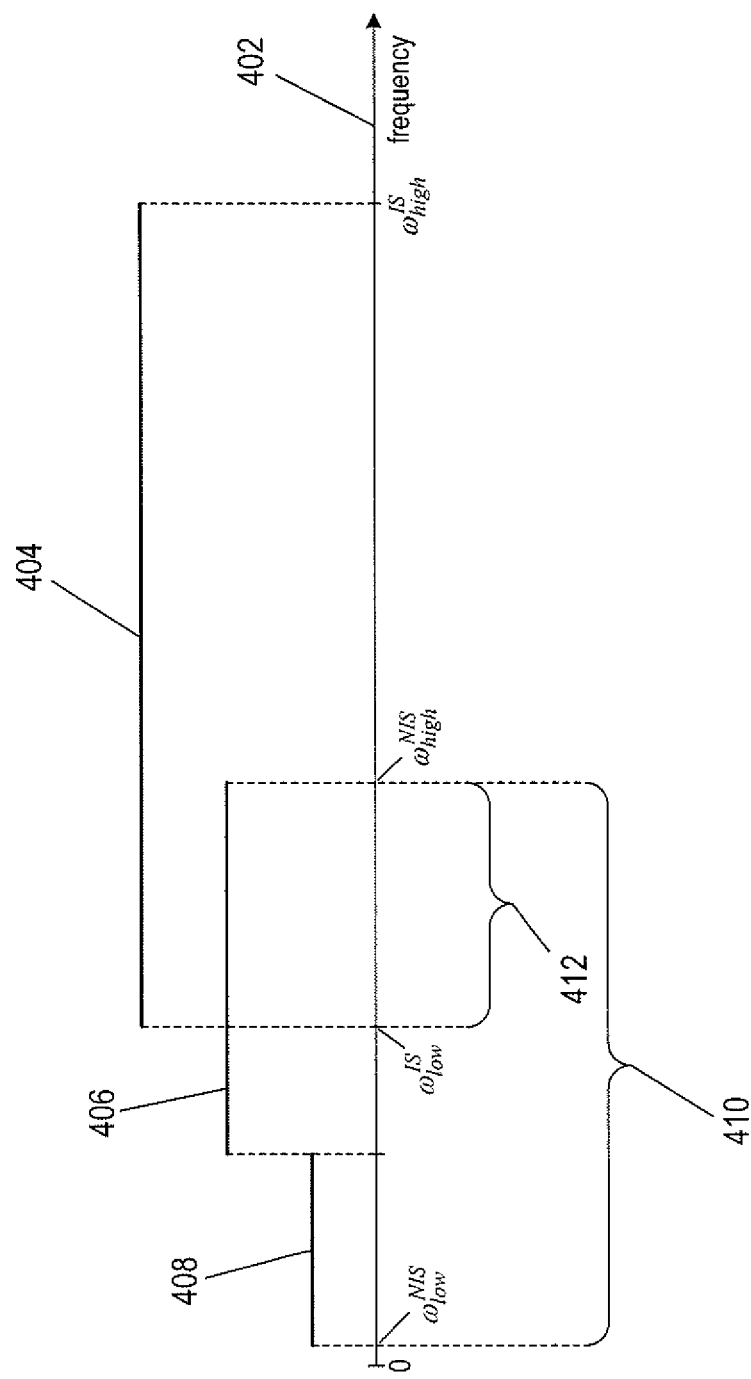
FIG. 4 shows an example of operating frequency ranges of an impulsive source and a non-impulsive source.

FIG. 4 shows an example of operating bands of frequency of an impulsive source and two non-impulsive source elements of a non-impulsive source. Directional arrow 402 represents an acoustic frequency axis. Line segment 404 represents an impulsive source band of frequencies of an impulsive source wavefield generated by an impulsive source. The impulsive source band of frequencies 404 is denoted by $\omega_{low}^{IS} \leq \omega \leq \omega_{high}$, where $\omega = 2\pi f$ is the angular frequency of a vibrational frequency f. On the other hand, line segment 406 represents a band of frequencies associated with a first non-impulsive source element and line segment 408 represents a band of frequencies associated with a second non-impulsive source element. The non-impulsive source wavefields generated by the first and second non-impulsive source elements has a combined non-impulsive source band of frequencies 410 denoted by $\omega_{low}^{NIS} \leq \omega \leq \omega_{high}^{NIS}$. In this example, the non-impulsive band of frequencies 410 overlaps the impulsive source band of frequencies 404 to produce an overlap band of frequencies 412 denoted by $\omega_{low}^{IS} \leq \omega \leq \omega_{high}^{NIS}$. The overall band of frequencies that illuminates the subterranean formation is denoted by $\omega_{low}^{NIS} \leq \omega \leq \omega_{high}^{IS}$.

The time varying amplitude of a pressure wave generated by an impulsive or non-impulsive source element or a source wavefield generated by an impulsive or non-impulsive source is called a "signature." The signature of a pressure wave varies with respect to the type of source element, how the source elements are combined to form a source, and distance from the source elements and source.

Figure 5:
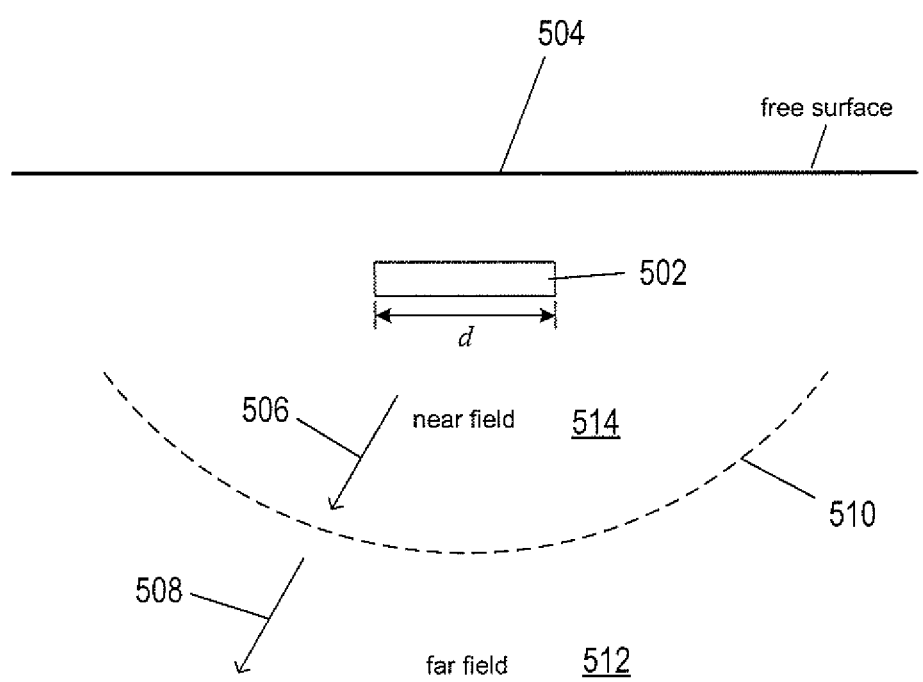
FIG. 5 shows how a signature of a source wavefield generated by a source varies with distance.

FIG. 5 shows how a signature of a source wavefield generated by a source (e.g., impulsive source or non-impulsive source) varies with distance. Block 502 represents a source, such as an impulsive source or a non-impulsive source, located below the free surface 504 of a body of water. In any given direction, such as the direction represented by directional arrows 506 and 508, the signature of the source wavefield is composed of pressure waves generated by source elements comprising the source and varies with increasing distance from the source 502 until, at a large enough distance, indicated by notional boundary 510, the signature of the source wavefield settles down to a stable shape (e.g., a spherically symmetric shape). At larger distances the signature remains substantially the same (e.g., a spherically symmetric shape) even though the amplitude of the signature decreases inversely with respect to the distance. The notional boundary 510 separates regions 512 and 514. The regions 512 and 514 may be three-dimensional (e.g., spherical) but are shown in vertical plane cross section in FIG. 5. The inner region 514 is called the "near field," which represents a region close to the source 502 where the signature of the source wavefield varies due to overlap signatures of the pressure waves generated separately by the source elements. By contrast, the outer region 512 is called the "far field," which represents a region away from the source 502 where the signature of the source wavefield does not change significantly with distance from the source 502. The far field 512 typically starts at distances greater than about $2d^2/\lambda$ from the center of the source 502, where d is a length dimension of the source 502, and $\lambda$ is the wavelength of the source wavefield generated by the source.

Returning to FIG. 2, the pressure sensors are located within the near field of the associated impulsive source elements. For example, the pressure sensor 209 is located within the near field of the impulsive source element 208.

Likewise, in FIGS. 3A-3B, the pressure sensors are also located within the near field of the associated non-impulsive source elements. For example, the pressure sensor 308 is located within the near field of the non-impulsive source element 302.

Figure 6A:
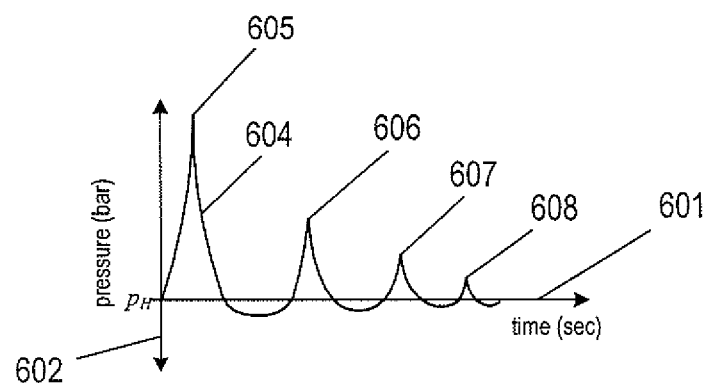
FIGS. 6A-6B show an example of near-field and far-field signatures.
Figure 6B:
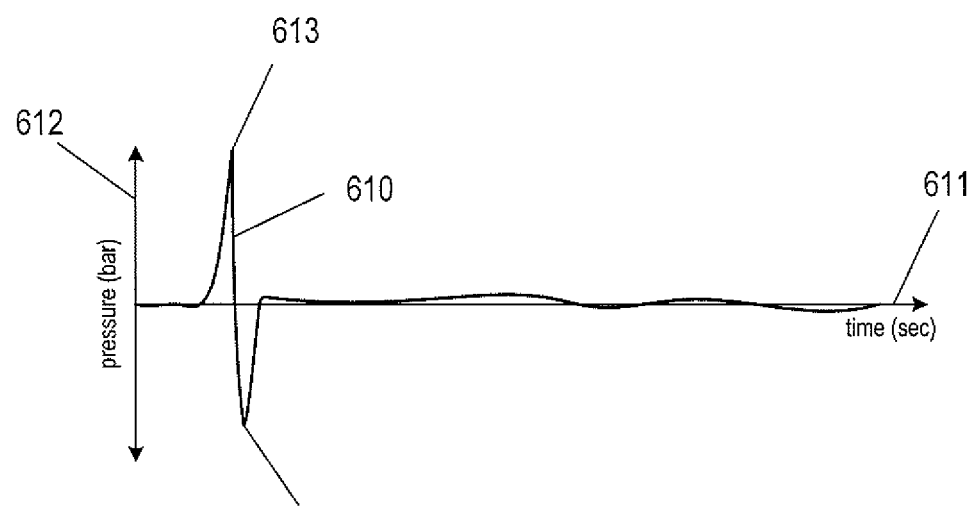

FIGS. 6A-6B show an example of how signatures of impulsive source elements change as the wavefields propagate from the near field to the far field. FIG. 6A shows an example plot of a near-field signature of an impulsive source. Horizontal axis 601 represents time, and vertical axis 602 represents pressure. Curve 604 represents variation in the driving pressure of an oscillating primary bubble (i.e., near-field signature) released by an impulsive source. First peak 605 represents an initial build-up and release of a bubble from the impulsive source into the fluid and subsequent peaks 606-608 represent a decrease in amplitude with increasing time. The near-field signature reveals that the pressure after reaching a peak falls to values below the hydrostatic pressure, $P_H$. The bubble oscillation amplitude decreases as time passes and the bubble period of oscillation is not constant from one cycle to the next. For example, the larger the chamber volume of an air gun, the larger the peak amplitudes and the longer the bubble periods. On the other hand, when an array of air guns are nearly simultaneously triggered, the pressure waves combine to form a source wavefield, such as the impulsive source wavefield 140 described above with reference to FIG. 1A. The impulsive sources may be selected with different chamber volumes, impulsive source element spacing, and impulsive source element positions within the array in order to amplify certain portions of the near-field signatures and cancel others.

FIG. 6B shows an example plot of a far-field signature 610 of a source wavefield output from an array of impulsive source elements. Horizontal axis 611 represents time and vertical axis represents pressure 612. The far-field signature 610 has a primary peak 613, which is a superposition of the initial pressure released from the impulsive source elements. Because the free surface of a body of water serves as a nearly perfect acoustic reflector, a portion of the pressure wave output from each impulsive source element expands upward and is reflected from the free surface and is called a "surface ghost reflection." A second peak 614 is a superposition of the pressure wave reflections from the free surface and is called a "ghost peak," which trails in time behind the primary peak 613. In the far field about half the energy in the propagating source wavefield originates from free surface ghost reflections represented by the ghost peak 614. The surface ghost reflection is about 180 degrees out of phase with the portion of the source wavefield that travels directly downward from the impulsive source.

Methods described herein include calculating the far-field signature of an impulsive source and the far-field signature of a non-impulsive source based on measured near-field signatures of the individual source elements. The near-field signature of an impulsive or non-impulsive source element is measured by a close proximity pressure sensor. For example, in FIG. 2, each impulsive source element has an associated pressure sensor, such as impulsive source element 208 and close proximity pressure sensor 216. The pressure sensor 216 measures the amplitude variation of the pressure wave (i.e., near-field signature) generated by the impulsive source element 208. For example, in FIG. 3A, the pressure sensors 308 and 310 measure the near-field signatures of the pressure waves generated by the corresponding non-impulsive source elements 302 and 304.

However, when the source elements (i.e., impulsive or non-impulsive source elements) are activated simultaneously or close in time, the signature of the pressure wave generated by one source element is affected by the pressure waves produced by other source elements. Consider, for example, activating a single impulsive source element, which creates an oscillating bubble. The oscillating bubble, in turn, creates a pressure wave that oscillates at seismic frequencies (i.e., vibrational frequencies that penetrate a subterranean formation). The amplitude of the pressure wave generated by the oscillating bubble is proportional to the distance, r, and is given by:

$$\frac{1}{r} p\left(t - \frac{r}{c}\right) \tag{2}$$

where
c is the speed of sound in water; and
p(•) is the pressure wavefield of the primary bubble as shown in FIG. 6A.

The behavior of the oscillating bubble may be characterized by:

$$P_d(t) = P(t) - P_H \tag{3}$$

where
$P_H$ is constant hydrostatic pressure of the water surrounding the bubble;
P(t) is the internal pressure of the bubble; and
$P_d(t)$ is the driving pressure of the bubble.

When $P_d(t) > 0$ the bubble expands and when $P_d(t) < 0$ the bubble collapses.

On the other hand, when N impulsive source elements inject air into the surrounding water close in time, such as when activating an air gun array, the hydrostatic pressure surrounding one oscillating bubble is affected by the pressure waves produced by the other N−1 oscillating bubbles. If there were no such interactions, the far-field signature of the impulsive source could be calculated by simply superposing the measured near-field signatures of the individual impulsive source elements and, likewise, the far-field signature of the non-impulsive source could be calculated by simply superposing the measured near-field signatures of the individual non-impulsive source elements. However, such calculated far-field signatures do not match measured far-field signatures. As a result, the law of superposition does not apply in this manner. In order to calculate a far-field signature of an impulsive source or a non-impulsive source, changes in the hydrostatic pressure due to activation of other source elements may be taken into account. In particular, the hydrostatic pressure surrounding an ith bubble in the presence of N−1 oscillating bubbles is represented by:

$$P_{Hi}(t) = P_{Hi} m_i(t) \tag{4}$$

where
$P_{Hi}$ is hydrostatic pressure surrounding the ith bubble;
$m_i(t)$ is the modulating pressure produced by the other bubbles; and
$P_{Hi}(t)$ is the time-variant hydrostatic pressure surrounding the ith bubble.

The driving pressure in the bubble produced by the ith impulsive source element is given by:

$$P'_{di}(t) = P'_i(t) - P_{Hi}(t) \tag{5}$$

where primes indicate the change in behavior due to interactions.

The dynamics of the ith bubble are affected by the changes in the water pressure. Therefore, the signature of the pressure wave generated by the ith bubble, denoted by $P'_i(t)$, is different from the signature of the pressure wave, P(t), generated by an isolated bubble with the driving pressure represented by Equation (3). Combining Equations (4) and (5) gives:

$$P'_{di}(t)=[P'_i(t)-m_i(t)]-P_{Hi} \quad (6)$$

Equation (6) is analogous to Equation (3) in that the modified bubble behaves as if the modified bubble was produced by an isolated impulsive source element, oscillating in water with constant hydrostatic pressure $P_{Hi}$ and internal pressure $P'_i(t)-m_i(t)$ with the signature of the pressure wave $P'_i(t)$. Equation (6) demonstrates that the interacting bubbles are equivalent to independent "notional" bubbles with notional internal pressure $P'_i(t)-m_i(t)$. The signature of the pressure wave, $P'_i(t)$, is called the "notional signature," which includes affects from pressure waves produced by bubbles generated by other impulsive source elements.

Although notional signatures are described above with reference to pressure waves generated by air guns, notional signatures also exist for a pressure wave generated by other types of impulsive source elements, such as water guns. The non-impulsive source elements of a non-impulsive source also have associated notional signatures.

The notional signatures of source elements are unknowns that are determined by solving systems of linear Equations (9) and (10) below. But locating a pressure sensor in close proximity to each source element, such as pressure sensors located close to impulsive and non-impulsive source elements as shown in FIGS. 2 and 3, the notional signatures of the source elements may be determined from the near-field pressures measured by the close proximity pressure sensors.

When a source element is triggered, the pressure wave radiates outward from the source element with essentially spherical symmetry. As a result, the pressure sensor located closest to the source element not only measures the pressure wave created by the closest source element but also measures the pressure wave generated by the other source elements. The pressure sensors also measure each pressure wave ghost reflection from the free surface. Each ghost reflection appears to have been generated by a virtual source element located the same distance above the free surface as the source element is located below the free surface.

The notional signatures of the source elements may be determined from the coordinate locations of the source elements, pressure sensors, and virtual source element. In the following description, Cartesian coordinates are used to represent the coordinates of source elements, virtual source elements, and pressure sensors. The Cartesian coordinates of the impulsive and non-impulsive source elements may be determined with respect to the origin of a Cartesian coordinate system used for the entire seismic data acquisition system or with the respect to the centers of the corresponding impulsive and non-impulsive sources.

Figure 7:
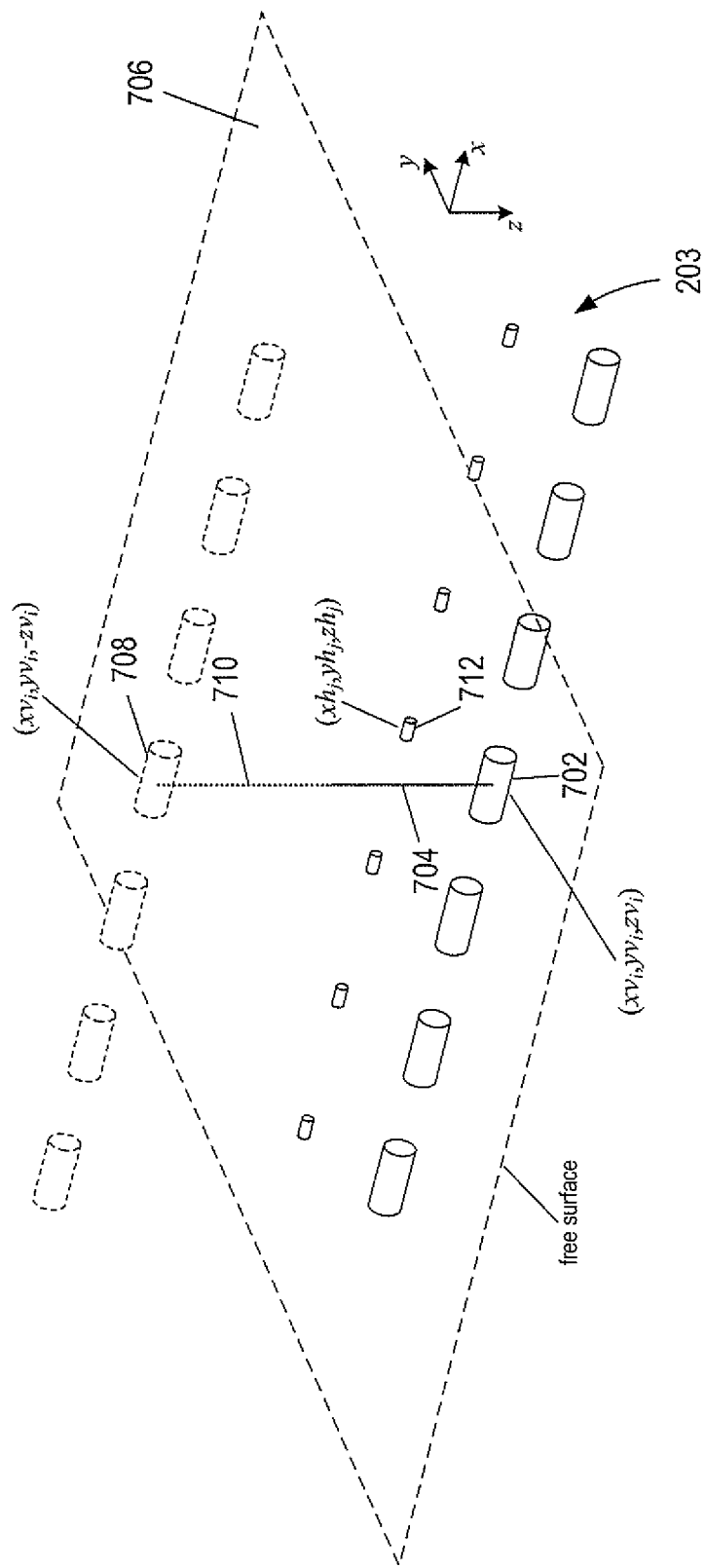
FIG. 7 shows an example of Cartesian coordinates of impulsive source elements, virtual impulsive source elements, and pressure sensors of an impulsive source.

FIG. 7 shows an example of Cartesian coordinates assigned to impulsive source elements, virtual impulsive source elements, and pressure sensors for the sub-array 203 of the impulsive source 200 shown in FIG. 2. In the example of FIG. 7, actual impulsive source elements and pressure sensors are drawn with solid lines, and virtual impulsive source elements are drawn with dashed lines. For example, cylinder 702 represents an actual impulsive source element located a distance 704 below the free surface 706 and dashed line cylinder 708 represents a virtual impulsive source element that corresponds to the impulsive source element 702 and is located the same distance 710 above the free surface 706. Cartesian coordinates of impulsive source elements, such as impulsive source element 702, are denoted by $(xv_i, yv_i, zv_i)$, where $xv_i$ and $yv_i$ represent the in-line and cross-line coordinates and $zv_i$ represents the depth of the impulsive source element below the free surface 706. Cartesian coordinates of the pressure sensors, such as pressure sensor 712, are denoted by $(xh_i, yh_i, zh_i)$, where $xh_i$ and $yh_i$ represent the in-line and cross-line coordinates and $zh_i$ represents the depth of the pressure sensor below the free surface 706. Cartesian coordinates of virtual impulsive source elements, such as virtual impulsive source element 708, are denoted by $(xv_i, yv_i, -zv_i)$, where $-zv_i$ represents the depth of the pressure sensor below the free surface 706.

Figure 8A:
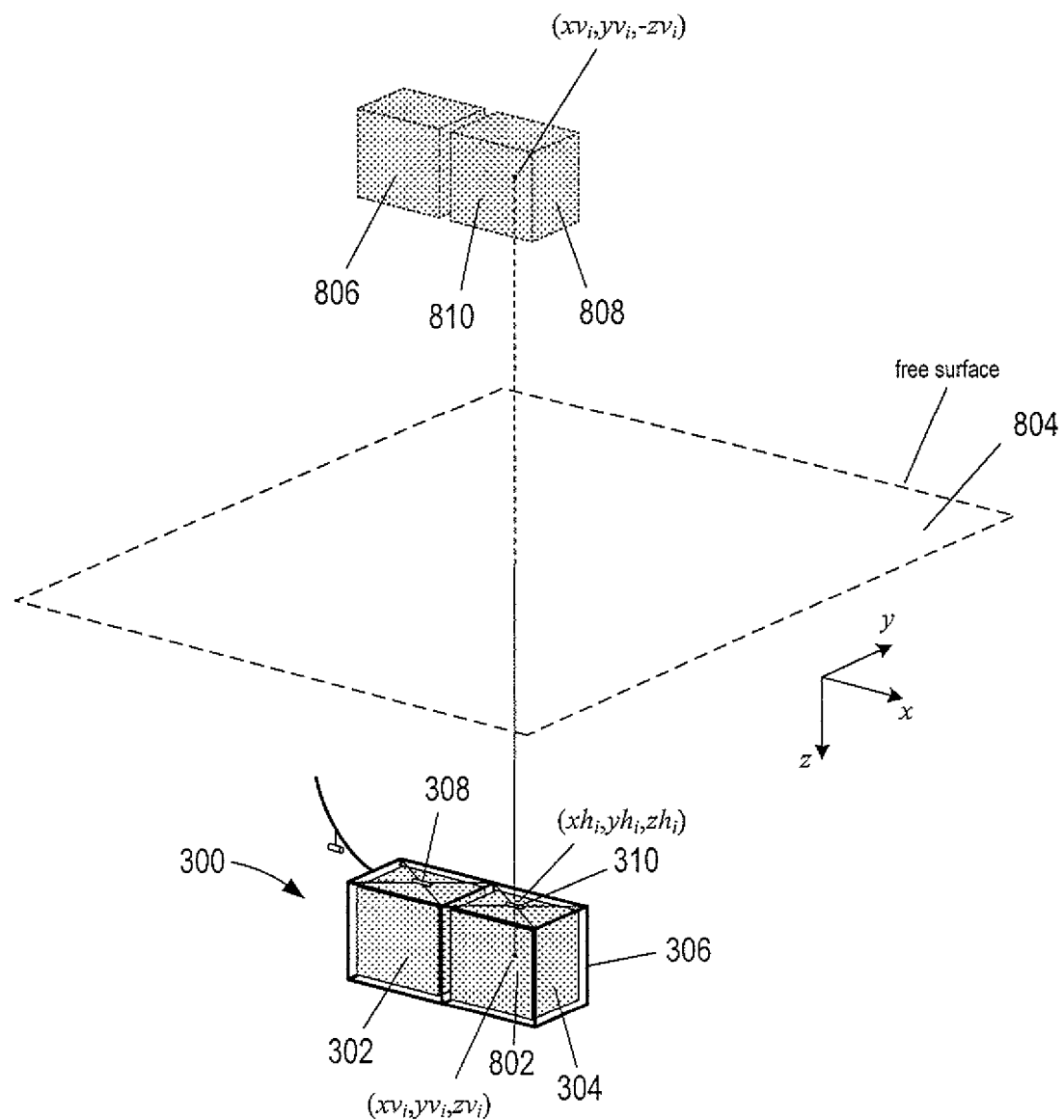
FIGS. 8A-8B show an example of Cartesian coordinates of non-impulsive source elements, virtual non-impulsive source elements, and pressure sensors of a non-impulsive source.

FIG. 8A shows an example of Cartesian coordinates assigned to non-impulsive source elements, virtual non-impulsive source elements, and pressure sensors of the non-impulsive source 300 shown in FIG. 3. Actual non-impulsive source elements and pressure sensors are drawn with solid lines and virtual non-impulsive source elements are drawn with dashed lines. Cartesian coordinates of the geometric center of the non-impulsive source elements, such as geometric center 802 of the non-impulsive source element 304, are denoted by $(xv_i, yv_i, zv_i)$, where $xv_i$ and $yv_i$ represent the in-line and cross-line coordinates and $zv_i$ represents the depth of the non-impulsive source element below the free surface 804. Cartesian coordinates of the pressure sensors, such as pressure sensor 310, are denoted by $(xh_i, yh_i, zh_i)$, where $xh_i$ and $yh_i$ represent the in-line and cross-line coordinates and $zh_i$ represents the depth of the pressure sensor below the free surface 804. FIG. 8A also shows virtual non-impulsive source elements 806 and 808 that correspond to non-impulsive source elements 302 and 304, respectively. Cartesian coordinates of the geometric center of the virtual non-impulsive source elements, such as geometric center 810 of virtual non-impulsive source element 808, are denoted by $(xv_i, yv_i, -zv_i)$, where $-zv_i$ represents the height of the virtual non-impulsive source element above the free surface 804.

Figure 8B:
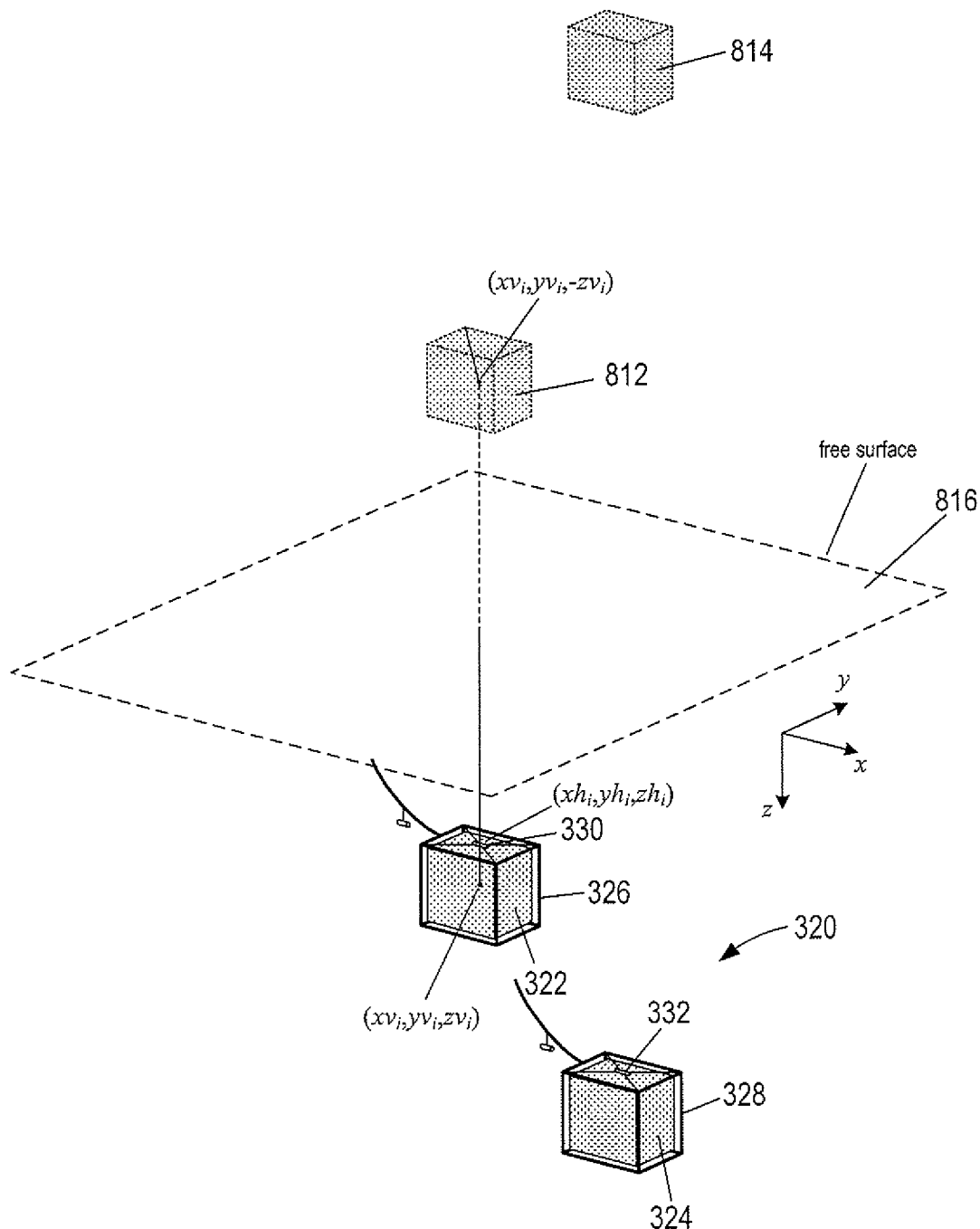

Cartesian coordinates may likewise be assigned to non-impulsive sources with separate non-impulsive source elements. FIG. 8B shows an example of Cartesian coordinates assigned to non-impulsive source elements, virtual non-impulsive source elements, and pressure sensors of the non-impulsive source 320 shown in FIG. 3. FIG. 8B shows virtual non-impulsive source elements 812 and 814 that correspond to non-impulsive source elements 322 and 324, respectively. Cartesian coordinates are also assigned to the geometric center of the non-impulsive source elements and virtual non-impulsive source elements with the free surface 816 corresponding to zero elevation in a similar to the manner in which Cartesian coordinate are assigned in FIG. 8A.

Figure 9:
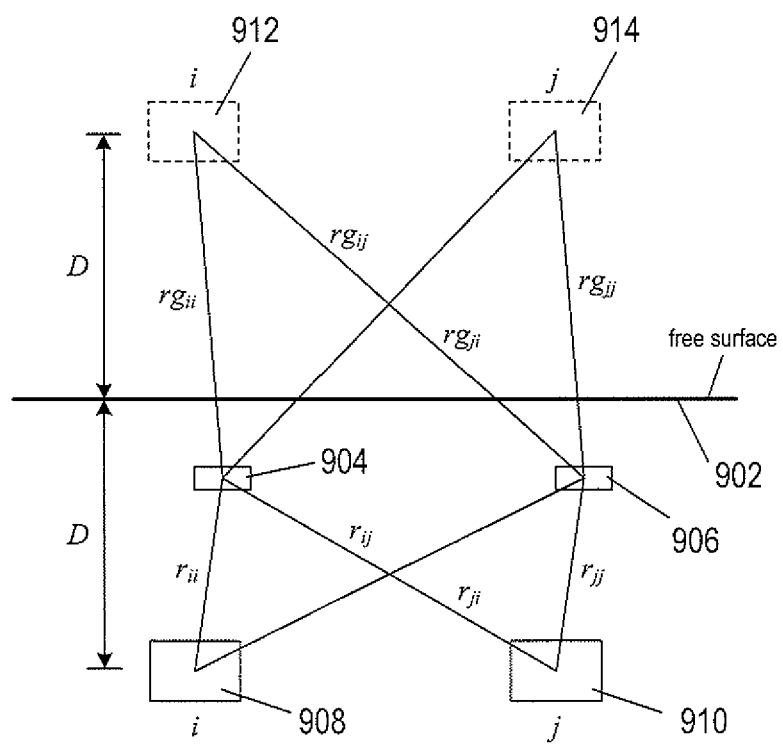
FIG. 9 shows distances between virtual source elements and pressure sensors and between source elements and pressure sensors.

Mathematical equations used to represent the notional source signatures depend on distances between the source elements and the pressure sensors and distances between the virtual source elements and the pressure sensors. FIG. 9 shows distances between virtual source elements and pressure sensors and between source elements and the pressure sensors. Line 902 represent a free surface of a body of water, and blocks 904 and 906 represent pressure sensors located beneath the free surface. Blocks 908 and 910 represent two impulsive or non-impulsive source elements. Dashed line blocks 912 and 914 represent the virtual counterparts of the source elements 908 and 910. The source elements 908 and 910 are located a depth D below the free surface 902, and the virtual source elements 912 and 914 are located a distance −D above the free surface 902. Lines connecting the blocks represent distances where i is a source element and corresponding virtual source element index and j is a pressure sensor index. Distances between the source elements 908 and 910 and the pressure sensors 904 and 906 are given by:

$$r_{ij} = \sqrt{(xv_i - xh_j)^2 + (yv_i - yh_j)^2 + (zv_i - zh_j)^2} \quad (7)$$

Distance between the virtual source elements 912 and 914 and the pressure sensors 904 and 906 are given by:

$$rg_{ij} = \sqrt{(xv_i - xh_j)^2 + (yv_i - yh_j)^2 + (zv_i - zh_j)^2} \quad (8)$$

Note that although time dependence is not represented in Equations (7) and (8), the distances computed in Equations (7) and (8) are actually time dependent. Because the survey vessels that tow the impulsive source and the non-impulsive source through a body of water are moving, as described above with reference to FIG. 1A-1B, the coordinate locations of the actual source elements, virtual source elements, and pressure sensors may vary with time.

The near-field signature output by the jth pressure sensor of an impulsive source may be represented as the superposition of the notional signatures of the impulsive source elements as follows:

$$p_j^{IS}(t) = \sum_{i=1}^{N} \frac{1}{r_{ij}} p_i^{IS'}\left(t - \frac{r_{ij}}{c}\right) + R \sum_{i=1}^{N} \frac{1}{rg_{ij}} p_i^{IS'}\left(t - \frac{rg_{ij}}{c}\right) \quad (9)$$

where $p_i^{IS_1}$ is the notional signature of the ith impulsive source element;

R is the free-surface reflectivity; and

N is the number of impulsive source elements.

When the impulsive source consists of N pressure sensors and N impulsive source elements, there are N independent equations in the form of Equation (9). The N independent equations form a system of N equations with N unknown notional signatures $p_i^{IS_1}$. The N independent equations may be solved numerically for the N unknown notional signatures $p_i^{IS_1}$. When the impulsive source consists of more than N pressure sensors, the additional pressure sensors may be used to quality check the solution and estimate errors.

The near-field signature output by the jth pressure sensor of a non-impulsive source may also be represented as the superposition of the notional signatures of the non-impulsive source elements as follows:

$$p_j^{NIS}(t) = \sum_{i=1}^{M} \frac{1}{r_{ij}} p_i^{NIS'}\left(t - \frac{r_{ij}}{c}\right) + R \sum_{i=1}^{M} \frac{1}{rg_{ij}} p_i^{NIS'}\left(t - \frac{rg_{ij}}{c}\right) \quad (10)$$

where $p_i^{NIS_1}$ is the notional signature of the ith non-impulsive source element; and M is the number of non-impulsive source elements.

When the non-impulsive source consists of M pressure sensors and M non-impulsive source elements, there are M independent equations in the form of Equation (10). The unknown notional signatures $p_i^{NIS_1}$ may be determined in the same manner as the notional signatures of Equation (9).

The distance between each pressure sensor and a corresponding impulsive source element or non-impulsive source element of the impulsive and non-impulsive sources, respectively, is within the near field of the impulsive or the non-impulsive source element. For example, the distance between a pressure sensor and an impulsive source element or a non-impulsive source element is about 1 meter. For example, in FIG. 9 the pressure sensor 904 may be located about 1 meter from corresponding source element 908 (i.e., $r_{i,j} \approx 1$ m while $r_{i,j+1} > 1$ m) and the pressure sensor 906 may be located about 1 meter from corresponding source element 910 (i.e., $r_{i+1,j+1} \approx 1$ m while $r_{i+1,j} > 1$ m).

The pressure sensors may be amplitude calibrated. When the pressure sensors are not calibrated, the relative sensitivities of the pressure sensors may be determined, with output errors that depend on the geometry determined by separate experiments. In an air gun array, the primary bubbles move relative to the pressure sensors because the acquisition system is moving in the water, and such motion may be included in the calibration.

After the N notional signatures of the impulsive source have been determined, the far-field signature of the impulsive source at a point in the far field of the impulsive source may be obtained by superposing the notional signatures of the impulsive source elements. Likewise, after the M notional signatures of the non-impulsive source have been determined, the far-field signature of the non-impulsive source at a point in the far field of the non-impulsive source may obtained by superposing the notional signatures of the non-impulsive source elements.

Figure 10:
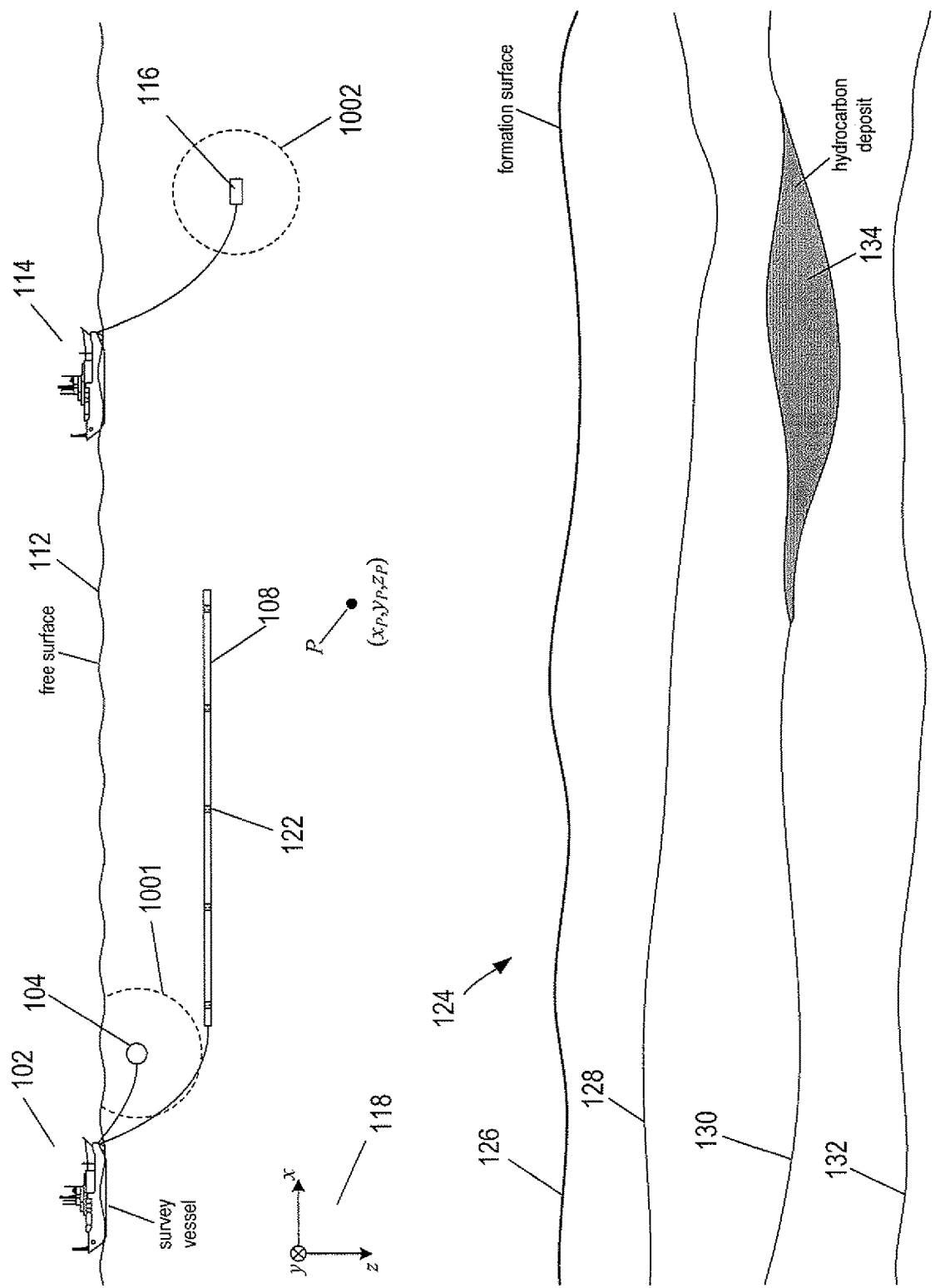
FIG. 10 shows a point located in the far fields of an impulsive source and a non-impulsive source.

FIG. 10 shows a point P located in the far field of the impulsive source 104 and the far field of the non-impulsive source 116. Dashed curve 1001 represents the notional boundary of the impulsive source 104 and dashed circle 1002 represents the notional boundary of the non-impulsive source 116. The notional boundaries 1001 and 1002 of the impulsive source 104 and non-impulsive source 116 are nearly spherically shaped but are shown in vertical cross-section. The Cartesian coordinates of the point P are denoted by $(x_P, y_P, z_P)$. The point P is located in the far field of both sources. The impulsive source far-field signature of the source wavefield produced by the impulsive source at the point P may be calculated as follows:

$$s^{IS}(t) = \sum_{i=1}^{N} \frac{1}{r_{iP}} p_i^{IS'}\left(t - \frac{r_{iP}}{c}\right) + R \sum_{i=1}^{N} \frac{1}{rg_{iP}} p_i^{IS'}\left(t - \frac{rg_{iP}}{c}\right) \quad (11)$$

where $r_{iP} = \sqrt{(xv_i - x_P)^2(yv_i - y_P)^2 + (z_{vi} - z_P)^2}$ is the distance from the ith impulsive source element to the point P; and $rg_{iP} = \sqrt{(xv_i - x_P)^2(yv_i - y_P)^2 + (z_{vi} - z_P)^2}$ is the distance from the ith virtual impulsive source element to the point P.

Likewise, the non-impulsive source far-field signature of the non-impulsive source wavefield produced by the non-impulsive source at the point P may calculated as follows:

$$s^{NIS}(t) = \sum_{i=1}^{N} \frac{1}{r_{iP}} p_i^{NIS'}\left(t - \frac{r_{iP}}{c}\right) + R \sum_{i=1}^{N} \frac{1}{rg_{iP}} p_i^{NIS'}\left(t - \frac{rg_{iP}}{c}\right) \quad (12a)$$

When the non-impulsive source is composed of a single non-impulsive source element, such as a marine vibrator or a superheterodyne transducer, the non-impulsive source far-field signature is given by:

$$s^{NIS}(t) = \frac{1}{r_P} p^{NIS}\left(t - \frac{r_P}{c}\right) + \frac{R}{rg_P} p^{NIS}\left(t - \frac{r_P}{c}\right) \quad (12b)$$

where
$r_P$ is the distance from the point P to the center of the non-impulsive source;
$rg_P$ is the distance from the point P to the center of a virtual non-impulsive source; and $$p^{NIS}\left(t - \frac{r_P}{c}\right)$$

is the near-field signature of the pressure measured by the pressure sensor located in close proximity to the non-impulsive source.

It should be noted that because the non-impulsive source is located outside the near field of the impulsive source (e.g., when the two sources are towed by separate survey vessels), calculation of the impulsive source far-field signature $s^{IS}(t)$, as represented by Equation (11), does not include near-field contributions from the non-impulsive source. Likewise, because the impulsive source is located outside the near field of the non-impulsive source, calculation of the non-impulsive source far-field signature $s^{NIS}(t)$, as represented by Equations (12a)-(12b), does not include near-field contributions from the impulsive source.

A combined far-field signature of the impulsive and non-impulsive source wavefields at the point P, shown in FIG. 10, may be represented by:

$$s(t) = s^{IS}(t) + s^{NIS}(t) \quad (13)$$

Equation (13) holds for the generalized point P in the far field of both the impulsive source 104 and non-impulsive source 116, as shown in FIG. 10. Thus, Equation (13) may also be used to represent the combined far-field signature of the impulsive and non-impulsive source wavefields measured at each receiver of the streamers.

A measured and effective phase of the impulsive source wavefield and non-impulsive source wavefield at each receiver may be represented by:

$$A(r_{IS}, r_{NIS})\Omega(r_{IS}, r_{NIS}) = \frac{S_{IS}(\omega)}{r_{IS}} e^{i(kr_{IS} + \phi_{IS})} + \frac{S_{NIS}(\omega)}{r_{NIS}} e^{i(kr_{NIS} + \phi_{NIS})} \quad (14)$$

where
i is the imaginary unit $\sqrt{-1}$;
$r_{IS}$ is the relative distance between the impulsive source and a receiver;
$r_{NIS}$ is the relative distance between the non-impulsive source and the receiver;
$\phi_{IS}$ is the characteristic phase of the impulsive source signatures;
$\phi_{NIS}$ is the characteristic phase of the non-impulsive source signatures;
k is the wavenumber of the wavefield;
$S_{IS}(\omega)$ is the impulsive source wavefield amplitude of $s^{IS}(t)$ transformed from the time domain to the frequency domain;
$S_{NIS}(\omega)$ is the non-impulsive source wavefield amplitude of $s^{NIS}(t)$ transformed from the time domain to the frequency domain;
A is a measured amplitude of combined impulsive and non-impulsive wavefields at the receiver; and
$\Omega$ contains the effective phase of the impulsive and non-impulsive wavefields at the receiver.

The quantities $kr_{IS}$ and $kr_{NIS}$ are propagation phase delays of corresponding impulsive and non-impulsive source wavefields.

Figure 11A:
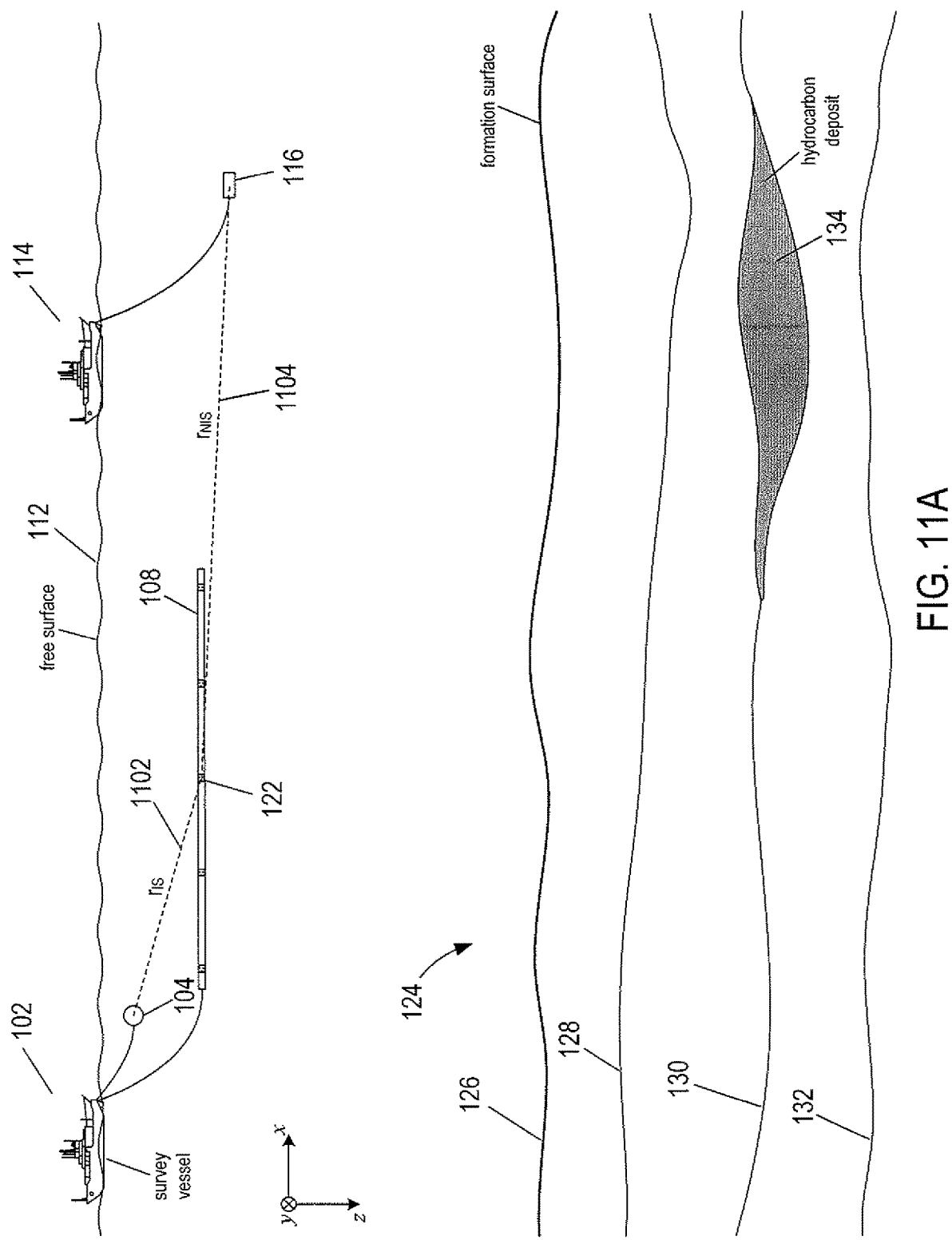
FIG. 11A shows example ray paths of an impulsive source and a non-impulsive source.

FIG. 11A shows a relative distance between the impulsive source 104 and the receiver 122 located along the streamer 108 and a relative distance between the non-impulsive source 116 and the same receiver 122. Dashed line 1102 represents the relative distance $r_{IS}$ between the receiver 122 and the impulsive source 104, and dashed line 1104 represents the relative distance $r_{NIS}$ between the receiver 122 and the non-impulsive source 116.

As explained above with reference to the example of FIG. 4, the band of frequencies of the non-impulsive source wavefield amplitude $S_{NIS}(\omega)$ ranges from $\omega_{low}^{NIS} \leq \omega \leq \omega_{high}^{NIS}$ and the band of frequencies of the impulsive source wavefield amplitude $S_{IS}(\omega)$ ranges from $\omega_{low}^{IS} \leq \omega \leq \omega_{high}^{IS}$. The impulsive and non-impulsive source wavefields may overlap in an overlap band of frequencies. Transforming the combined far-field signature of Equation (13) from the time domain to the frequency domain using a fast Fourier transform ("FFT") or a discrete Fourier transform ("DFT") gives:

$$S(\omega) = \begin{cases} S_{NIS}(\omega) & \omega_{low}^{NIS} \leq \omega < \omega_{low}^{IS} \\ S_{NIS}(\omega) + S_{IS}(\omega) & \omega_{low}^{IS} \leq \omega \leq \omega_{high}^{NIS} \\ S_{IS}(\omega) & \omega_{high}^{NIS} < \omega \leq \omega_{high}^{IS} \end{cases} \quad (15)$$

Equation (14) may be rewritten as follows:

$$A(r_{IS}, r_{NIS})\Omega(r_{IS}, r_{NIS}) = \quad (16)$$

$$\begin{cases} \frac{S_{NIS}(\omega)}{r_{NIS}} e^{i(kr_{NIS} + \phi_{NIS})} & \omega_{low}^{NIS} \leq \omega < \omega_{low}^{IS} \\ \frac{S_{IS}(\omega)}{r_{IS}} e^{i(kr_{IS} + \phi_{IS})} + \frac{S_{NIS}(\omega)}{r_{NIS}} e^{i(kr_{NIS} + \phi_{NIS})} & \omega_{low}^{IS} \leq \omega \leq \omega_{high}^{NIS} \\ \frac{S_{IS}(\omega)}{r_{IS}} e^{i(kr_{IS} + \phi_{IS})} & \omega_{high}^{NIS} < \omega \leq \omega_{high}^{IS} \end{cases}$$

In the overlap band of frequencies $\omega_{low}^{IS} \leq \omega \leq \omega_{high}^{NIS}$, when a receiver is located at approximately equal distances between the impulsive and non-impulsive sources (i.e., $r_{IS} \approx r_{NIS}$), and assuming that the impulsive and non-impulsive wavefield amplitudes are approximately the same (i.e., $S_{IS}(\omega) \approx S_{NIS}(\omega)$), Equation (16) reduces to $$A(r)\Omega(r) = \frac{S(\omega)}{r}(e^{i(kr + \phi_{IS})} + e^{i(kr + \phi_{NIS})}) \quad (17)$$

where
$r = r_{IS} \approx r_{NIS}$;
$S(\omega)$ is a frequency dependent amplitude of the wavefield generated by the source taken to be the same for the impulsive and the non-impulsive sources; and
kr is a phase delay due to propagation of the wavefield.
The exponential quantities $(kr + \phi_{IS})$ and $(kr + \phi_{NIS})$ of Equation (17) are the impulsive source wavefield phase and the non-impulsive source wavefield phase, respectively. When the impulsive source 104 and the non-impulsive source 116 are towed at approximately equal distances r from a receiver, the effective phase of Equation (17) may be written as $$\Omega(r) = (e^{i(kr + \phi_{IS})} + e^{i(kr + \phi_{NIS})}) = e^{i\theta_{IS}}(1 + e^{i(\theta_{NIS} - \theta_{IS})}) \quad (18)$$

Thus, the quantity $\theta_{NIS}-\theta_{IS}$ is the phase difference between the impulsive and non-impulsive wavefields at the receiver. When $\theta_{NIS}=-\theta_{IS}$, maximum destructive interference occurs at the receiver. On the other hand, when $\theta_{NIS}=\theta_{IS}$, maximum constructive interference occurs at the receiver.

In the overlap band of frequencies, because the characteristic phases $\phi_{IS}$ and $\phi_{NIS}$ may be treated as fixed quantities of the impulsive and the non-impulsive source wavefields, respectively, the phase delay $kr_{NIS}$ of the non-impulsive source wavefield phase $\theta_{NIS}$ may be used to achieve $\theta_{NIS}\approx\theta_{IS}$ (i.e., near maximum constructive interference) by adjusting the distance $r_{NIS}$. Alternatively, the phase delay $kr_{IS}$ of the impulsive source wavefield phase $\theta_{IS}$ may also be used to achieve $\theta_{NIS}\approx\theta_{IS}$ by adjusting the distance $r_{IS}$.

Because the characteristic phase $\phi_{IS}$ of the impulsive source wavefield and the characteristic phase $\phi_{NIS}$ of the non-impulsive source wavefield may be shifted or lagged by adjusting the corresponding relative distances $r_{IS}$ and $r_{NIS}$, relative distances $r_{IS}$ and $r_{NIS}$ may be adjusted to achieve a near maximum constructive interference (i.e., $\theta_{NIS}\approx\theta_{IS}$) at one or more receivers locations along the steamers. As a result, receiver locations along the streamers may experience a reduction in the level of destructive interference and an increase in the level of constructive interference.

For example, in FIG. 11A, because the first survey vessel tows the impulsive source 104 a fixed relative distance in front of the receivers, such as fixed relative distance $r_{IS}$ in front of the receiver 122, the relative distance between the non-impulsive source and the receivers, $r_{NIS}$, may be adjusted to tune the impulsive source wavefield phase $\theta_{IS}$ and the non-impulsive source wavefield phase $\theta_{NIS}$ to create near maximum constructive interference (i.e., $\theta_{NIS}\approx\theta_{IS}$) at one or more receivers locations.

Figure 11B:
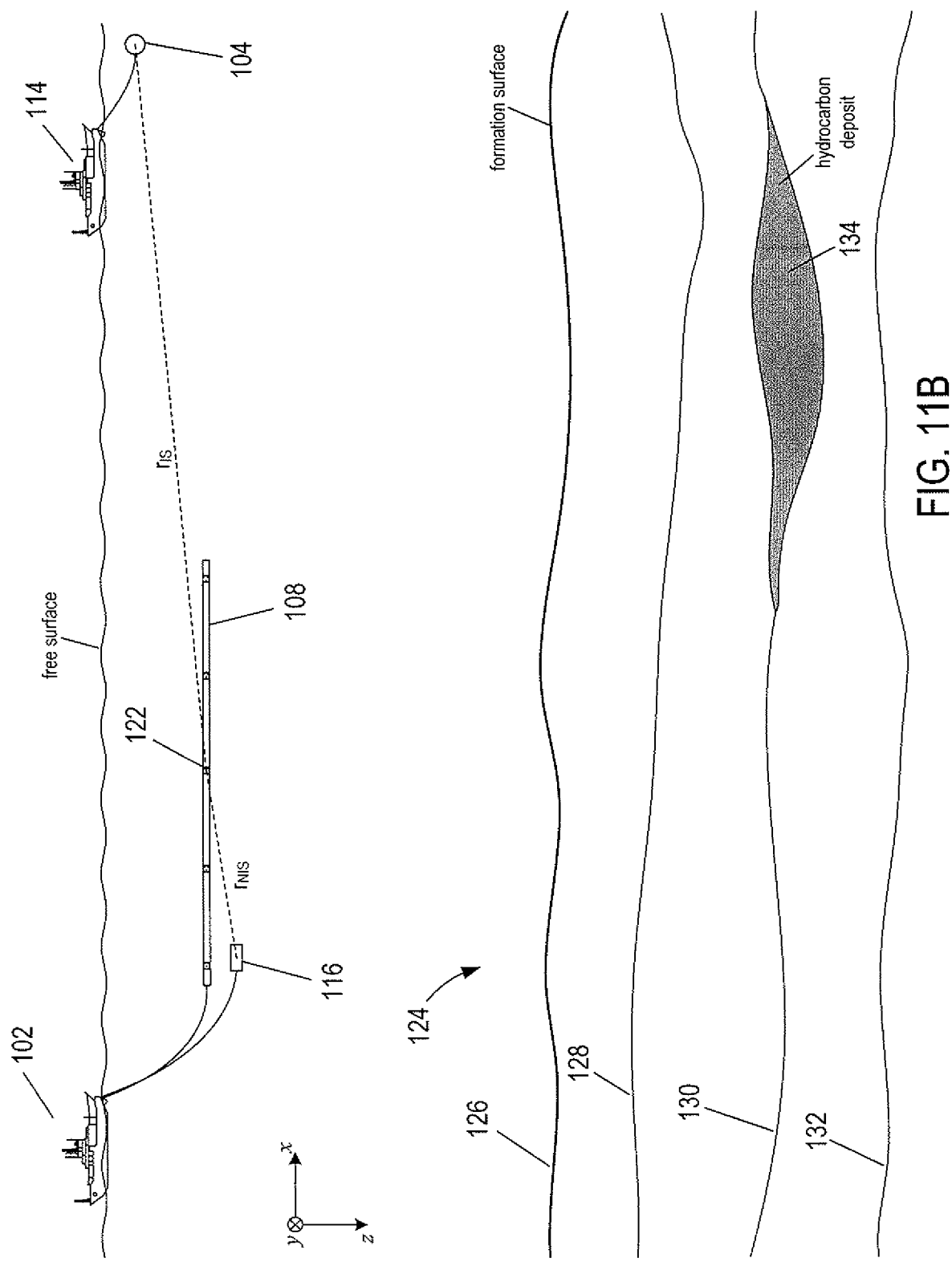
FIG. 11B shows example operation of the impulsive and non-impulsive sources shown in FIG. 11A.

In an alternative execution of a marine survey, the impulsive source 104 and non-impulsive source 116 may be switched. As shown in FIG. 11B, the first survey vessel 102 tows the non-impulsive source 116 and the six separate streamers 106-111, and the second survey vessel 114 tows the impulsive source 104. In the example of FIG. 11B, because the first survey vessel tows the non-impulsive source 116 a fixed relative distance in front of the receivers, such as fixed relative distance $r_{NIS}$ in front of the receiver 122, the relative distance between the impulsive source 104 and the receivers, $r_{IS}$, may be adjusted to tune the impulsive source wavefield phase $\theta_{IS}$ and the non-impulsive source wavefield phase $\theta_{NIS}$ to create near maximum constructive interference (i.e., $\theta_{NIS}\approx\theta_{IS}$) at one or more receivers locations.

In the overlap band of frequencies, when the non-impulsive source 116 is towed behind the streamers as shown in FIG. 11A with $r_{NIS}\gg r_{IS}$, Equation (16) reduces to:

$$A(r_{IS})\Omega(r_{IS}) \approx \frac{S_{IS}(\omega)}{r_{IS}} e^{i(kr_{IS}+\phi_{IS})} \tag{19}$$

where $\omega_{low}^{IS} \leq \omega \leq \omega_{high}^{IS}$; and $\frac{S_{NIS}(\omega)}{r_{NIS}} e^{i(kr_{NIS}+\phi_{NIS})} \to 0$ as the relative distance $r_{NIS}$ increases.

In other words, Equation (13) becomes $s(t)\approx s^{IS}(t)$ and $s^{NIS}(t)\approx 0$ as the relative distance $r_{NIS}$ increases. Thus, the combined far-field signature $s(t)$ may be computed from Equation (11).

On the other hand, when the impulsive source 104 is towed behind the streamers as shown in FIG. 11B with $r_{IS}\gg r_{NIS}$, Equation (16) reduces to:

$$A(r_{NIS})\Omega(r_{NIS}) \approx \frac{S_{NIS}(\omega)}{r_{NIS}} e^{i(kr_{NIS}+\phi_{NIS})} \tag{20}$$

where $\omega_{low}^{NIS} \leq \omega \leq \omega_{high}^{NIS}$; and $\frac{S_{IS}(\omega)}{r_{IS}} e^{i(kr_{IS}+\phi_{IS})} \to 0$ as the relative distance $r_{IS}$ increases.

In other words, Equation (13) becomes $s(t)\approx s^{NIS}(t)$ and $s^{IS}(t)\approx 0$ as the relative distance $r_{IS}$ increases. Thus, the combined far-field signature $s(t)$ may be computed from Equation (12a) or Equation (12b).

Streamers may have lengths of that range from as long as approximately 20 km or longer to as short as approximately 5 km or less. In particular, streamers may have lengths of 10 km or 5 km. As a result, the distance between the impulsive source 104 and the non-impulsive source 116 may be greater than the lengths of streamers, and the intensities of the impulsive and non-impulsive source wavefields that illuminate the subterranean formation 124 may not be uniform. The impulsive source 104 and the non-impulsive source 116 may be simultaneously activated to illuminate the subterranean formation 124. In other words, the impulsive source 104 and non-impulsive source 116 may be activated without a time delay. In particular, the non-impulsive source 116 may be activated continuously throughout a marine survey and the impulsive source may be activated with random time delays. As used herein, "activated continuously", "continuously activating", or "continuously activated" indicate that the non-impulsive source is energized over a period of time that is significantly (at least 5 times as much) longer than the typical time for activation and detection of a primary signal from an impulsive source (also referred to as "shot time"). Thus, a non-impulsive source may be "activated continuously" by being energized during portions of the marine survey, while still being not energized during other portions (e.g., during turning of the survey vessel).

Each receiver generates seismic data that represents the reflected wavefield emitted from the subterranean formation in response to the impulsive source wavefield and the non-impulsive source wavefield and includes the impulsive source wavefield and the non-impulsive source wavefield that travel directly from the impulsive and non-impulsive sources to the receivers. The seismic data generated by a receiver in response to illuminating the subterranean formation with the acoustic energy produced by activation of both the impulsive source and the non-impulsive source is represented by the expression:

$$x(t)=s(t)*g(t)+n(t) \tag{21}$$

where

"*" denotes convolution operation;

g(t) is the seismic response of the subterranean formation to the acoustic energy (i.e., combined impulsive and non-impulsive source wavefields) produced by both the impulsive source and the non-impulsive source; and n(t) is noise.

The seismic data x(t) may be pressure data generated by a pressure sensor or particle motion data (e.g., particle displacement data, particle velocity data, or particle acceleration data) generated by a particle motion sensor. The seismic data x(t) may be time sampled and stored in one or more data-storage devices, such as one or more data-storage devices located on board the first survey vessel 102.

The seismic data x(t) may be transformed from the time domain to the frequency domain using an FFT or a DFT to obtain seismic data in the frequency domain given by:

$$X(\omega)=S(\omega)G(\omega)+N(\omega) \quad (22a)$$

where $X(\omega)$ is the amplitude spectrum of the seismic data generated by the receiver in the frequency domain;

$G(\omega)$ is the seismic response of the subterranean formation to the acoustic energy in the frequency domain; and $N(\omega)$ is noise in the frequency domain.

According to Equation (15), Equation (22a) may be expanded over the bands of frequencies associated with the impulsive and non-impulsive sources as follows:

$$X(\omega) = \begin{cases} S_{NIS}(\omega)G_{NIS}(\omega) + N(\omega) & \omega_{low}^{NIS} \leq \omega < \omega_{low}^{IS} \\ (S_{NIS}(\omega) + S_{IS}(\omega))G(\omega) + N(\omega) & \omega_{low}^{IS} \leq \omega \leq \omega_{high}^{NIS} \\ S_{IS}(\omega)G_{IS}(\omega) + N(\omega) & \omega_{high}^{NIS} < \omega \leq \omega_{high}^{IS} \end{cases} \quad (22b)$$

where $G_{NIS}(\omega)$ is the seismic response of the subterranean formation to the acoustic energy generated by the non-impulsive source; and $G_{IS}(\omega)$ is the seismic response of the subterranean formation to the acoustic energy generated by the impulsive source.

The impulsive source may be towed in front of the streamers and operated with a random time delay while simultaneously and continuously activating the non-impulsive source towed behind the streamers. A cross-correlation technique may be applied in time windows of the seismic data in Equation (22b) using the non-impulsive far-field source signature (i.e., $s^{NIS}(t)$) to separate the seismic data into non-impulsive source seismic data and impulsive source seismic data. In the frequency-domain, the non-impulsive source seismic data in the overlap band of frequencies $\omega_{low}^{IS} \leq \omega \leq \omega_{high}^{NIS}$ is given by:

$$X_{NIS}(\omega)=S_{NIS}(\omega)G_{NIS}(\omega)+N_c(\omega) \quad (23)$$

And the impulsive source seismic data in the overlap band of frequencies is given by:

$$X_{IS}(\omega)=S_{IS}(\omega)G_{IS}(\omega)+N(\omega) \quad (24)$$

where $N_c(\omega)$ is the noise associated with separation.

The non-impulsive source may be towed in front of the streamers and activated continuously while impulsive source is operated with a random time delay towed behind the streamers. A cross-correlation technique may be applied in time windows of the seismic data in Equation (22b) using the impulsive far-field source signature (i.e., $s^{IS}(t)$) to obtain the same results given by Equations (23) and (24). The cross-correlation technique may be a simultaneous source separation ("SSS") technique, such as the SSS techniques described in U.S. Pat. No. 6,906,981 and published U.S. Pat. No. 9,075,162. In other words, the frequency-domain seismic data may be separated in the overlap band of frequencies $\omega_{low}^{IS} \leq \omega \leq \omega_{high}^{NIS}$ as follows:

$$X(\omega)=X_{IS}(\omega)+X_{NIS}(\omega) \quad (25)$$

The results in Equations (22b) and (23) may be combined to give the non-impulsive source seismic data in the frequency domain over the full non-impulsive source band of frequencies, $\omega_{low}^{NIS} \leq \omega \leq \omega_{high}^{NIS}$, is given by:

$$\tilde{X}_{NIS}(\omega) = \begin{cases} S_{NIS}(\omega)G_{NIS}(\omega) + N(\omega) & \omega_{low}^{NIS} \leq \omega < \omega_{low}^{IS} \\ X_{NIS}(\omega) & \omega_{low}^{IS} \leq \omega \leq \omega_{high}^{NIS} \end{cases} \quad (26)$$

Deconvolving $\tilde{X}_{NIS}(\omega)$ by $S_{NIS}(\omega)$ gives the seismic response of the subterranean formation to the acoustic energy generated by the non-impulsive source, $G_{NIS}(\omega)$, plus noise. Equations (26) may be transformed from the frequency domain to the time domain using an inverse FFT or inverse DFT to give the non-impulsive source seismic data, $x^{NIS}(t)$ in the time domain.

The results of Equations (22b) and (24) may be combined to give the impulsive source seismic data in the frequency domain over the full impulsive source band of frequencies, $\omega_{low}^{IS} \leq \omega \leq \omega_{high}^{IS}$, is given by:

$$\tilde{X}_{IS}(\omega) = \begin{cases} X_{IS}(\omega) & \omega_{low}^{IS} \leq \omega \leq \omega_{high}^{NIS} \\ S_{IS}(\omega)G_{IS}(\omega) + N(\omega) & \omega_{high}^{NIS} < \omega \leq \omega_{high}^{IS} \end{cases} \quad (27)$$

Deconvolving $\tilde{X}_{NIS}(\omega)$ by $S_{IS}(\omega)$ gives the seismic response of the subterranean formation to the acoustic energy generated by the impulsive source, $G_{IS}(\omega)$, plus noise. Equations (27) may be transformed from the frequency domain to the time domain using an inverse FFT or inverse DFT to give the impulsive source seismic data, $x^{IS}(t)$ in the time domain.

Because the non-impulsive source may be activated continuously or over longer intervals of time than the impulsive source, the non-impulsive source far-field signature $s^{NIS}(t)$ typically has a long duration. One way to shorten or compress the duration of the non-impulsive source far-field signature $s^{NIS}(t)$ is to apply a time-compression filter f(t) that time compresses the non-impulsive source far-field signature $s^{NIS}(t)$ to a short-duration wavelet d(t), represented by:

$$d(t)=f(t)*s^{NIS}(t) \quad (28)$$

Figure 12:
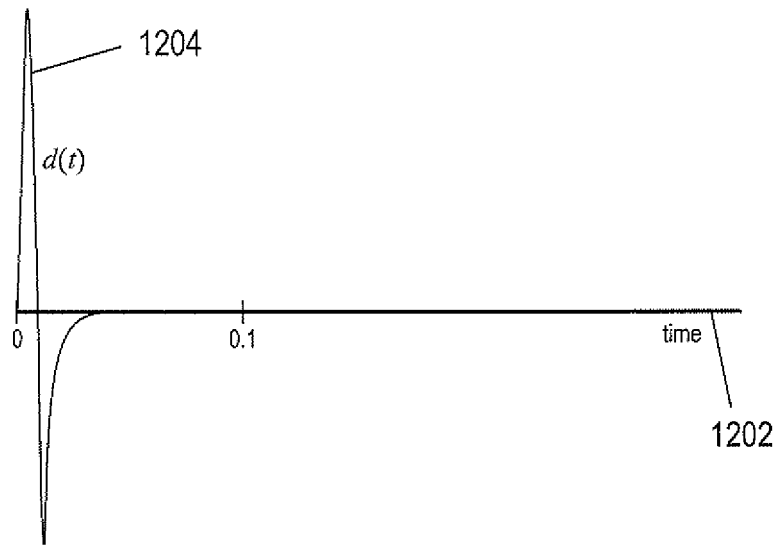
FIG. 12 shows an example plot of a shot-duration wavelet.

FIG. 12 shows an example plot of a shot-duration wavelet d(t). Horizontal axis 1202 represents time and curve 1204 is a short-duration wavelet representation of d(t). The time-compression filter f(t) may be computed as described below.

Figure 13:
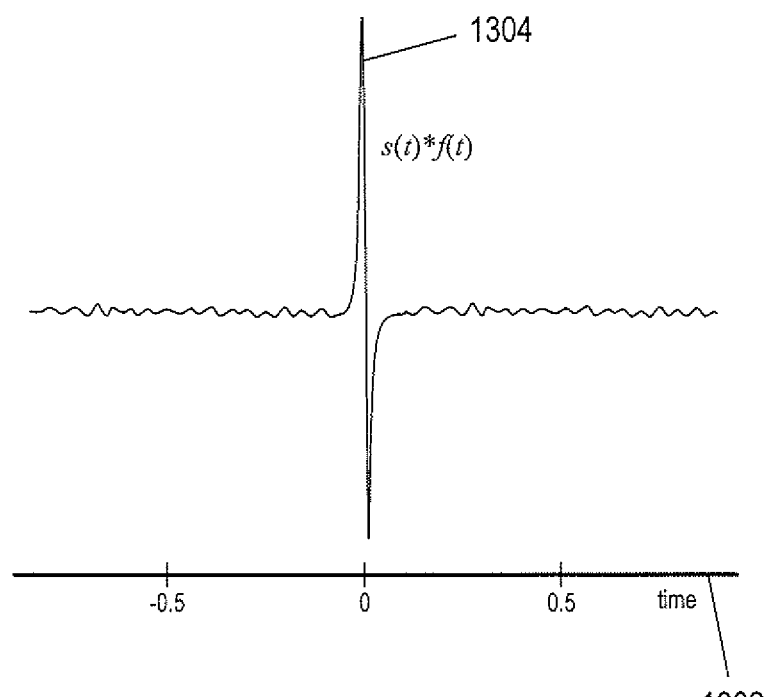
FIG. 13 shows an example plot of a filter convolved with a combined impulsive and non-impulsive far-field signature.

FIG. 13 shows an example plot of a time-compression filter f(t) convolved with the non-impulsive source far-field signature $s^{NIS}(t)$. Horizontal axis 1302 represents time and curve 1304 is the time-compression filter f(t) convolved with the non-impulsive source far-field signature $s^{NIS}(t)$. In FIG. 13, $f(t)*s^{NIS}(t)$ is a wavelet centered at approximately time zero.

The time-compression filter f(t) may be convolved with the non-impulsive source seismic data $x^{NIS}(t)$ in the time domain to obtain:

$$\tilde{x}^{NIS}(t) = f(t) * x^{NIS}(t) = \quad (29)$$
$$f(t)*s^{NIS}(t)*g^{NIS} + f(t)*n(t) = d(t)*g^{NIS} + f(t)*n(t)$$

Equation (29) gives time-compressed non-impulsive source seismic data in the time domain. The long duration of the non-impulsive source far-field signature $s^{NIS}(t)$ is replaced with a short-duration wavelet d(t).

The time-compression filter f(t) may be computed as follows. Consider a filter f(t) that minimizes a difference between the short-duration wavelet d(t) and the time-compression filter f(t) convolved with the non-impulsive source far-field signature $S^{NIS}(t)$ as follows:

$$f(t) * s^{NIS}(t) - d(t) \quad (31)$$

The time-compression filter f(t) may be composed of K+1 filter coefficients represented by a row matrix:

$$f = [f_0 \ldots f_K]^T \quad (32)$$

where
T is transpose; and
$f_l$ is a filter coefficient with index l=0, 1, ..., K.
Components of $f(t)*s^{NIS}(t)$ may be represented by:

$$c(t_j) = \sum_{l=0}^{K} f_l s^{NIS}(t_{j-l}) \quad (33)$$

where
j=0, 1, ..., J is the time sample index; and
J is the number of time samples.
An error energy between the short-duration wavelet d(t) and the time-compression filter f(t) applied to the non-impulsive source far-field signature $s^{NIS}(t)$ is given by:

$$Q(f) = \sum_{j=0}^{K+J} \left\{ d(t_j) - \sum_{l=0}^{K} f_l s^{NIS}(t_{j-l}) \right\}^2 \quad (34)$$

The time-compression filter coefficients minimize the error by setting:

$$\frac{\partial Q(f)}{\partial f_k} = 2 \sum_{j=0}^{K+J} \left\{ d(t_j) - \sum_{l=0}^{K} f_l s^{NIS}(t_{j-l}) \right\} d(t_{j-k}) = 0 \quad (35)$$

for k=0, 1, ..., K. Rearranging Equation (35) gives:

$$\sum_{j=0}^{K+J} d(t_j) s^{NIS}(t_{j-k}) = \sum_{l=0}^{K} f_l \sum_{j=0}^{K+J} \{s^{NIS}(t_{j-l}) s^{NIS}(t_{j-k})\} \quad (36)$$

Equation (36) may be rewritten in matrix form to obtain:

$$u_{ds} = U_{ss} f_k \quad (37a)$$

where
$u_{ds}$ is an (K+1)×1 cross-correlation column matrix of the non-impulsive source far-field signature $s^{NIS}(t)$ with matrix elements $$u_k = \sum_{j=0}^{K+J} d(t_j) s^{NIS}(t_{j-k}) \quad (37b)$$

and $U_{ss}$ is an (K+1)×(K+1) auto-correlation matrix of the non-impulsive source far-field signature $s^{NIS}(t)$ with matrix elements $$U_{lk} = \sum_{j=0}^{K+J} s^{NIS}(t_{j-l}) s^{NIS}(t_{j-k}) \quad (37c)$$

The time-compression filter coefficients are computed by multiplying the matrix equation in Equation (37a) by the inverse of the auto-correlation matrix $$f = U_{ss}^{-1} u_{ds} \quad (38)$$

where $U_{ss}^{-1}$ is the inverse of the auto-correlation matrix $U_{ss}$ provided the auto-correlation matrix is invertible.

Figure 14:
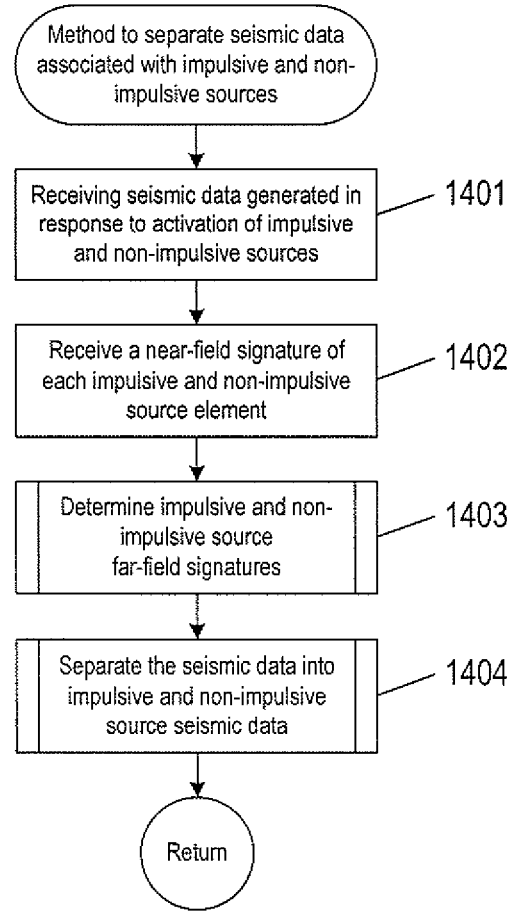
FIG. 14 shows a flow diagram of a method to determine a response of a subterranean formation to activation of an impulsive source and a non-impulsive source.

FIG. 14 shows a flow diagram of a method to separate seismic data associated with impulsive and non-impulsive sources. In block 1401, seismic data generated by one or more receivers in response to an impulsive source wavefield generated by an impulsive source and a non-impulsive source wavefield generated by a non-impulsive source are received. The impulsive source may be activated with random time delays while the non-impulsive source may be continuously activated. In block 1402, near-field signatures of each impulsive source element of an impulsive source are received from pressure sensors located within the near field of each impulsive source element and near-field signatures of each non-impulsive source element of the non-impulsive source are received from pressure sensors located within the near field of each non-impulsive source element. In block 1403, a routine "determine impulsive and non-impulsive source far-field signatures" is called to compute the impulsive and non-impulsive source far-field signatures for each receiver based on the near-field signatures of the impulsive source and non-impulsive source. In block 1404, a routine "separate the seismic data into impulsive and non-impulsive source seismic data" is called to compute separate impulsive and non-impulsive source seismic data.

Figure 15:
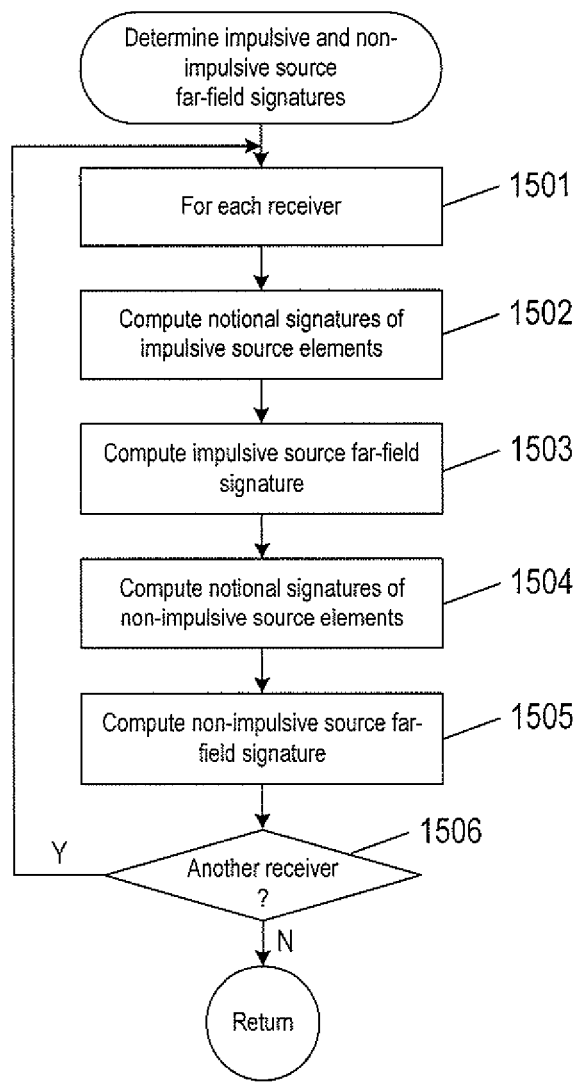
FIG. 15 shows a control-flow diagram of the routine "determine impulsive and non-impulsive far-field source signatures" called in FIG. 14.

FIG. 15 shows a control-flow diagram of the routine "determine impulsive and non-impulsive far-field source signatures" called in block 1403 of FIG. 14. A for-loop beginning in block 1501 repeats the operations represented by blocks 1502-1505 for each receiver location. In block 1502, notional signatures of the impulsive source are computed as described above with reference to Equation (9). In block 1503, an impulsive source far-field signature is computed as described above with reference to Equation (11) based on the notion signatures computed in block 1502. In block 1504, notional signatures of the non-impulsive source are computed as described above with reference to Equation (10). In block 1504, a non-impulsive source far-field signature is computed as described above with reference to Equation (12a) or (12b) based on the notional signatures computed in block 1503. In decision block 1506, the operations represented by blocks 1502-1505 are repeated for another receiver location.

Figure 16:
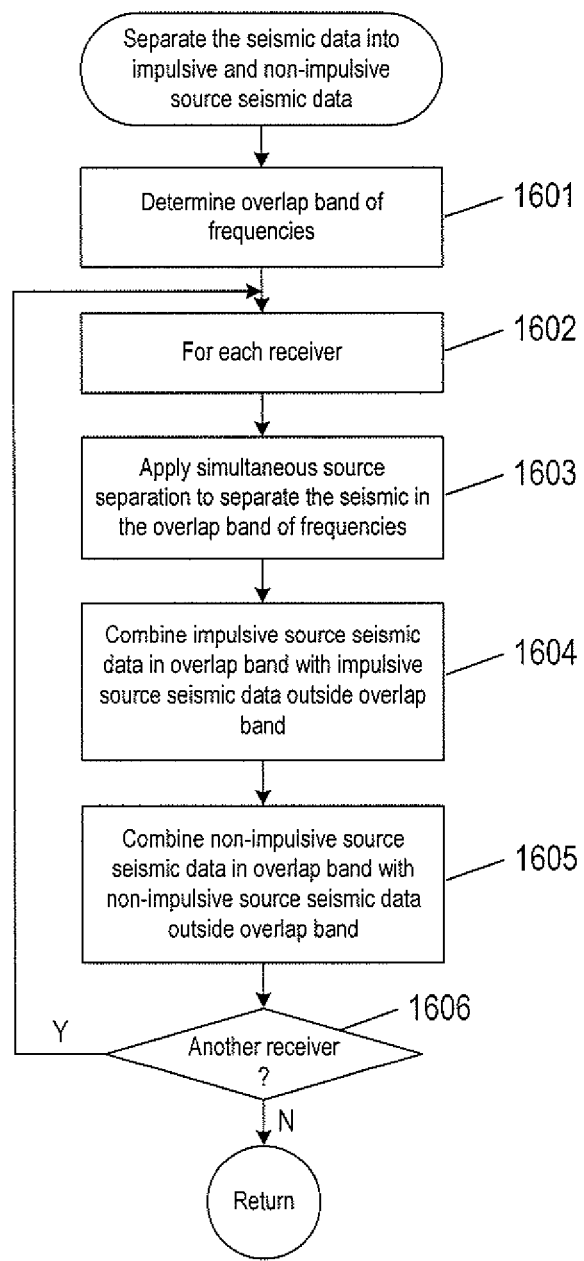
FIG. 16 shows a control-flow diagram of the routine "separate the seismic data into impulsive and non-impulsive source seismic data" called in FIG. 14.

FIG. 16 shows a control-flow diagram of the routine "separate the seismic data into impulsive and non-impulsive source seismic data" called in block 1404 of FIG. 14. In block 1601, an overlap band of frequencies between an impulsive source band of frequencies and a non-impulsive source band of frequencies is determined described above with reference to FIG. 4. A for-loop beginning with block 1602 repeats the operations represented by blocks 1606 for each receiver. In block 1603, simultaneous source separation is a technique that may be used to separate the seismic data into the impulsive source seismic data in the overlap band of frequencies and the non-impulsive source seismic data in the overlap band of frequencies. In block 1604, the impulsive source seismic data in the overlap band of frequencies is combined with the impulsive source seismic data outside the overlap band of frequencies as described above with reference to Equation (27). In block 1605, the non-impulsive source seismic data in the overlap band of frequencies is combined with the non-impulsive source seismic data outside the overlap band of frequencies as described above with reference to Equation (26). In decision block 1606, the operations of blocks 1603-1605 are repeated for another receiver.

Figure 17:
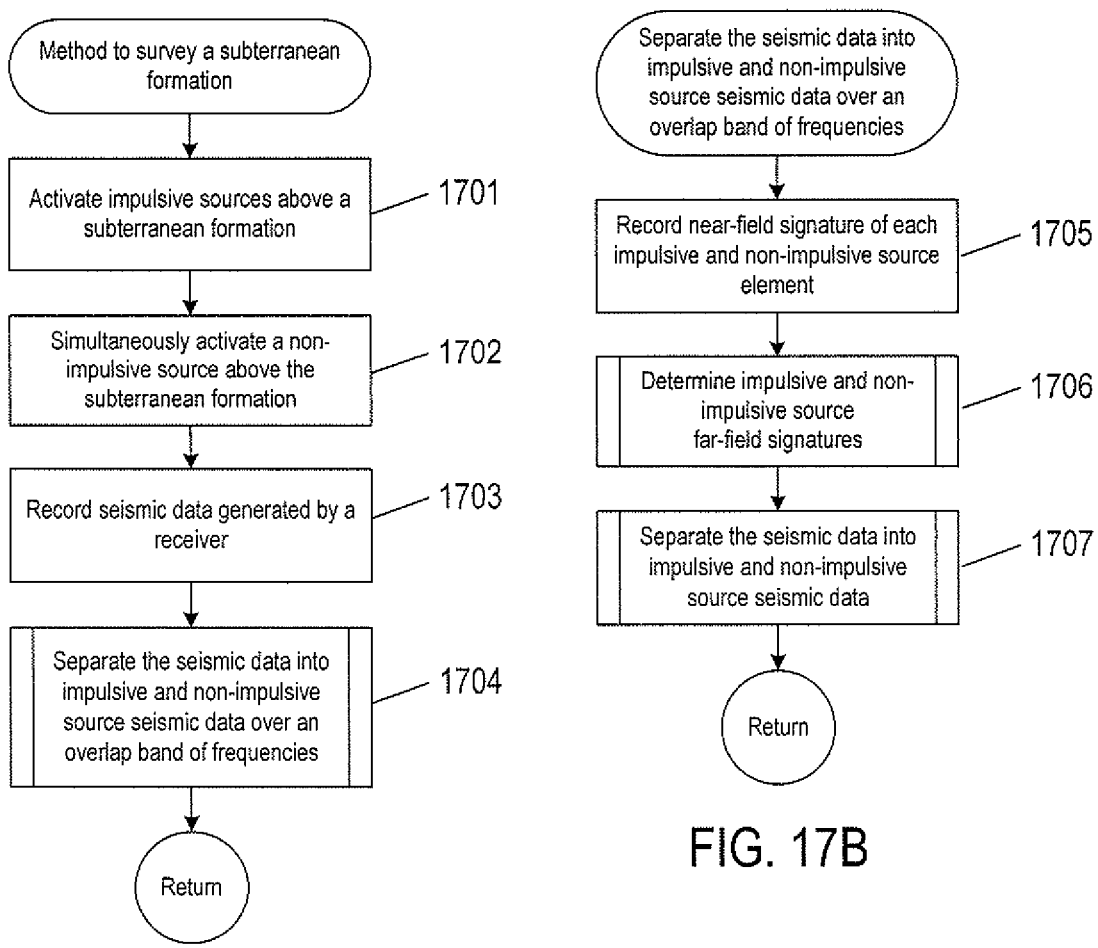
FIG. 17A shows a flow diagram of a method to survey a subterranean formation.
FIG. 17B shows a flow diagram of the routine "separate the seismic data into impulsive and non-impulsive source seismic data over the overlap band of frequencies" called in FIG. 17A.

FIG. 17A shows a flow diagram of a method to survey a subterranean formation. In block 1701, an impulsive source is activated above the subterranean formation to generate an impulsive source wavefield that has an impulsive source band of frequencies. In block 1702, a non-impulsive source is simultaneous activated above the subterranean formation to generate a non-impulsive source wavefield. The non-impulsive source band of frequencies and the impulsive source band of frequencies have an overlap band of frequencies. In block 1703, seismic data generated by one or more receivers is recorded. The seismic data represents the response of the subterranean formation to the impulsive and non-impulsive source wavefields. In block 1704, a routine "separate the seismic data into impulsive and non-impulsive source seismic data over the overlap band of frequencies" is called.

FIG. 17B shows a flow diagram of the routine "separate the seismic data into impulsive and non-impulsive source seismic data over the overlap band of frequencies" called in block 1704 of FIG. 17A. In block 1706, the routine "determine impulsive and non-impulsive source far-field signatures" described above with reference to FIG. 15 is called to compute the impulsive and non-impulsive source far-field signatures for each receiver based on the near-field signatures of the impulsive source and non-impulsive source. In block 1707, the routine "separate the seismic data into impulsive and non-impulsive source seismic data" described above with reference to FIG. 16 is called to compute separate impulsive and non-impulsive source seismic data.

Figure 18:
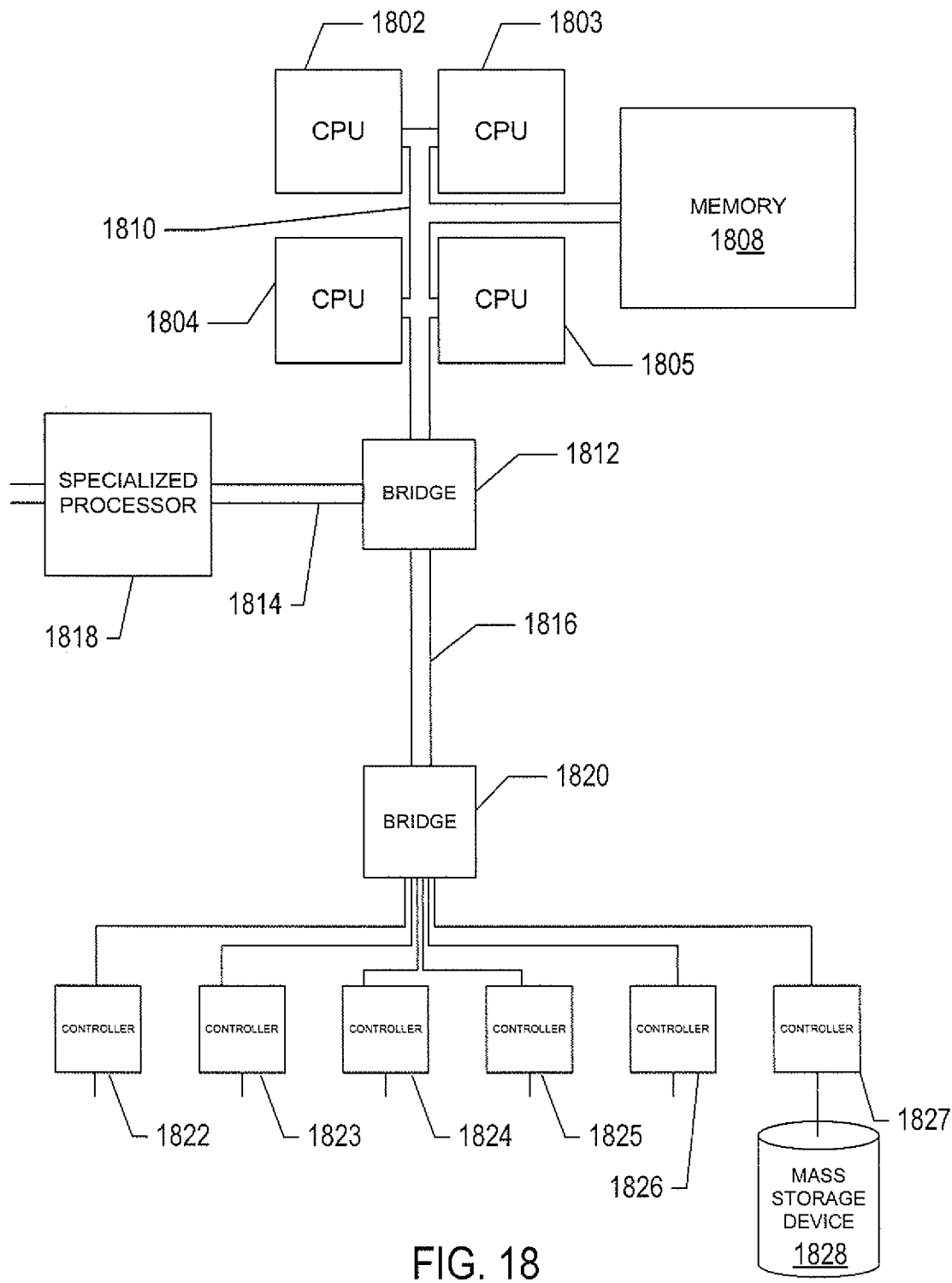
FIG. 18 shows an example of a generalized computer system.

FIG. 18 shows an example of a generalized computer system that executes efficient methods to determine a response of a subterranean formation to activation of an impulsive source and a non-impulsive source. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1802-1805, one or more electronic memories 1808 interconnected with the CPUs by a CPU/memory-subsystem bus 1810 or multiple busses, a first bridge 1812 that interconnects the CPU/memory-subsystem bus 1810 with additional busses 1814 and 1816, or other types of high-speed interconnection media, including multiple, high-speed serial interconnects. The busses or serial interconnections, in turn, connect the CPUs and memory with specialized processors, such as a graphics processor 1818, and with one or more additional bridges 1820, which are interconnected with high-speed serial links or with multiple controllers 1822-1827, such as controller 1827, that provide access to various different types of computer-readable media, such as computer-readable medium 1828, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1828 is a non-transitory data-storage device, including electronic memory, optical or magnetic disk drive, USB drive, flash memory and other such data-storage device. The computer-readable medium 1828 can be used to store machine-readable instructions and routines that encode the computational methods described above in machine-readable instructions and can be used to store encoded seismic data, during store operations, and from which encoded seismic data can be retrieved, during read operations, by computer systems, data-storage systems, and peripheral devices.

The methods and systems disclosed herein may form a geophysical data product indicative of certain properties of a subterranean formation. The geophysical data product may include geophysical data such as impulsive source wavefield data, non-impulsive source wavefield data, seismic data generated by a receiver, pressure data, particle motion data, GPS data, impulsive source seismic data, non-impulsive source seismic data, near-field signature of an impulsive source element, near-field signature of an non-impulsive source element, impulsive source far-field signature, non-impulsive source far-field signature, and processed geophysical data, and the geophysical data product may be stored on a non-transitory computer-readable medium as described above. The geophysical data product may be produced offshore (i.e., by equipment on the survey vessel 102) or onshore (i.e., at a computing facility on land) either within the United States or in another country. When the geophysical data product is produced offshore or in another country, it may be imported onshore to a data-storage facility in the United States. Once onshore in the United States, geophysical analysis may be performed on the geophysical data product.

Although the above disclosure has been described in terms of particular implementations, it is not intended for the disclosure be limited to these implementations. Modifications within the spirit of this disclosure will be apparent to those skilled in the art. For example, any of a variety of different implementations may be obtained by varying any of many different design and development parameters, including programming language, underlying operating system, modular organization, control structures, data structures, and other such design and development parameters. Thus, the present disclosure is not intended to be limited to the implementations shown herein but is to be accorded the widest scope consistent with the principles and novel features disclosed herein.

The invention claimed is:

1. A method to survey a subterranean formation, the method comprising:
activating an impulsive source above the subterranean formation to generate an impulsive source wavefield having an impulsive source band of frequencies;
simultaneously activating a non-impulsive source above the subterranean formation to generate a non-impulsive source wavefield having a non-impulsive source band of frequencies that overlap the impulsive source band of frequencies;
recording seismic data generated by a receiver, the seismic data represents the response of the subterranean formation to the impulsive and non-impulsive source wavefields; and separating the seismic data into impulsive source seismic data and non-impulsive source seismic data over the overlap band of frequencies.

2. The method of claim 1, wherein separating the seismic data further comprises:
recording a near-field signature of each impulsive source element of the impulsive source and a near-field signature of each non-impulsive source element of the non-impulsive source;
determining an impulsive source far-field signature of the impulsive source at a location of the receiver based on the near-field signatures of the impulsive source elements and a non-impulsive source far-field signature of the non-impulsive source at the location of the receiver based on the near-field signatures of the non-impulsive source elements; and
separating the seismic data into impulsive source seismic data and non-impulsive source seismic data based on one of the impulsive source far-field signature and the non-impulsive source far-field signature.

3. The method of claim 2, wherein the near-field signature of each impulsive source element of the impulsive source further comprises a pressure wavefield measured by a pressure sensor located within the near field of each impulsive source element of the impulsive source.

4. The method of claim 2, wherein the near-field signature of each non-impulsive source element of the non-impulsive source further comprises a pressure wavefield measured by a pressure sensor located within the near field of each non-impulsive source element of the non-impulsive source.

5. The method of claim 2, wherein determine the impulsive and non-impulsive source far-field signatures further comprises:
computing a notional signature for each impulsive source element of the impulsive source, based on the near-field signatures of the impulsive source elements;
computing an impulsive source far-field signature of the impulsive source based on the notional signatures of each impulsive source element;
computing a notional signature for each non-impulsive source element of the non-impulsive source, based on the near-field signatures of the non-impulsive source elements; and
computing a non-impulsive source far-field signature of the non-impulsive source based on the notional signatures of each non-impulsive source element.

6. The method of claim 1, further comprising time compressing the non-impulsive source seismic data.

7. The method of claim 1, wherein simultaneously activating the non-impulsive source further comprises continuously activating the non-impulsive source.

8. The method of claim 1, further comprises:
computing a time-compression filter based on the non-impulsive far-field signature; and
applying the time-compression filter to the non-impulsive seismic data to generate time-compressed non-impulsive seismic data.

9. The method of claim 1, wherein separating the seismic data into impulsive source seismic data and non-impulsive source seismic data further comprises separating the seismic data in an overlap band of frequencies between impulsive source band of frequencies and a non-impulsive source band of frequencies.

10. The method of claim 1, wherein the impulsive source seismic data having an associated impulsive source band of frequencies and the non-impulsive source seismic data having an associated impulsive source band of frequencies that overlaps the impulsive source band of frequencies.

11. The method of claim 1, further comprising:
towing the impulsive source in front of the receiver; and
towing the non-impulsive source behind the receiver to create destructive interference between the impulsive and non-impulsive source wavefields at a location of the receiver.

12. The method of claim 1, further comprising:
towing the non-impulsive source in front of the receiver; and
towing the impulsive source behind the receiver to create destructive interference between the impulsive and non-impulsive source wavefields at a location of the receiver.

13. The method of claim 1, wherein activating in the impulsive source further comprises activating the impulsive source with a random time delay between activations.

14. The method of claim 1, further comprises generating a geophysical data product from the impulsive source seismic data and the non-impulsive source seismic data.

15. The method of claim 1, further comprises storing the impulsive source seismic data and non-impulsive source seismic data in a data-storage device.

* * * * *